United States Patent
Shiraishi

(10) Patent No.: US 10,554,452 B2
(45) Date of Patent: Feb. 4, 2020

(54) ELECTRONIC DEVICE AND METHOD OF RECEIVING DATA

(71) Applicant: Toshiba Memory Corporation, Minato-ku, Tokyo (JP)

(72) Inventor: Mikio Shiraishi, Yokohama Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 16/047,230

(22) Filed: Jul. 27, 2018

(65) Prior Publication Data
US 2019/0296944 A1    Sep. 26, 2019

(30) Foreign Application Priority Data
Mar. 22, 2018    (JP) ................. 2018-055004

(51) Int. Cl.
*H04L 7/00*    (2006.01)
*H04L 25/03*   (2006.01)

(52) U.S. Cl.
CPC ...... *H04L 25/03057* (2013.01); *H04L 7/0041* (2013.01); *H04L 7/0045* (2013.01); *H04L 2025/03764* (2013.01)

(58) Field of Classification Search
CPC ....... H04L 2025/0349; H04L 25/03019; H04L 25/03267; H04L 2025/03503; H04L 25/03057; H04L 7/0041; H04L 7/0045; H04L 2025/03764; H03H 2021/0059; H03H 17/04; H03H 17/06
See application file for complete search history.

(56) References Cited

U.S. PATENT DOCUMENTS 8,953,669 B2    2/2015  Amamiya
2013/0294493 A1*  11/2013  Kono ............... H04B 3/10
                                              375/232

FOREIGN PATENT DOCUMENTS

| JP | 2005-159466 A | 6/2005 |
|---|---|---|
| JP | 2013-162146 A | 8/2013 |
| JP | 5639667 B2 | 12/2014 |
| WO | 2005-050867 A1 | 6/2005 |

* cited by examiner

*Primary Examiner* — Rahel Guarino
(74) *Attorney, Agent, or Firm* — White & Case LLP

(57) ABSTRACT

According to one embodiment, an electronic device executes decision feedback-type equalization for input data using a tap coefficient while updating the tap coefficient. The electronic device includes a first memory cyclically receiving a tap coefficient, holing the tap coefficient received, and cyclically outputting the tap coefficient held, and a second memory receiving the tap coefficient cyclically output from the first memory and holding the tap coefficient received. The tap coefficient cyclically output from the first memory is delayed by at least one cycle than the tap coefficient cyclically received by the first memory. The tap coefficient held in the second memory is used for the decision feedback-type equalization in a no-signal period in which no input data exist.

16 Claims, 19 Drawing Sheets

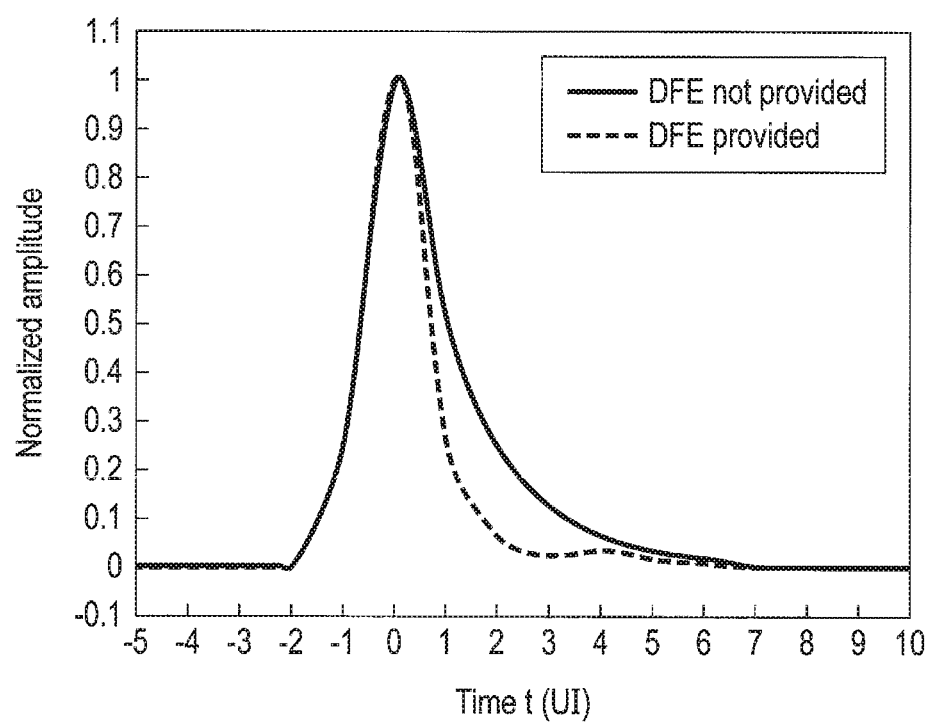
F I G. 2

| Output of decision circuit 1 | Output of decision circuit 2 | Tap 0 coefficient |
|---|---|---|
| 0 | Don't Care | Invariable |
| 1 | 0 | Increase |
| 1 | 1 | Decrease |

FIG. 5

| Output of decision circuit 1 | Tap n outputs | Output of decision circuit 2 | Tap n coefficients |
|---|---|---|---|
| 0 | Don't Care | Don't Care | Invariable |
| 1 | 0 | 0 | Increase |
| 1 | 0 | 1 | Decrease |
| 1 | 1 | 0 | Decrease |
| 1 | 1 | 1 | Increase |

FIG. 6

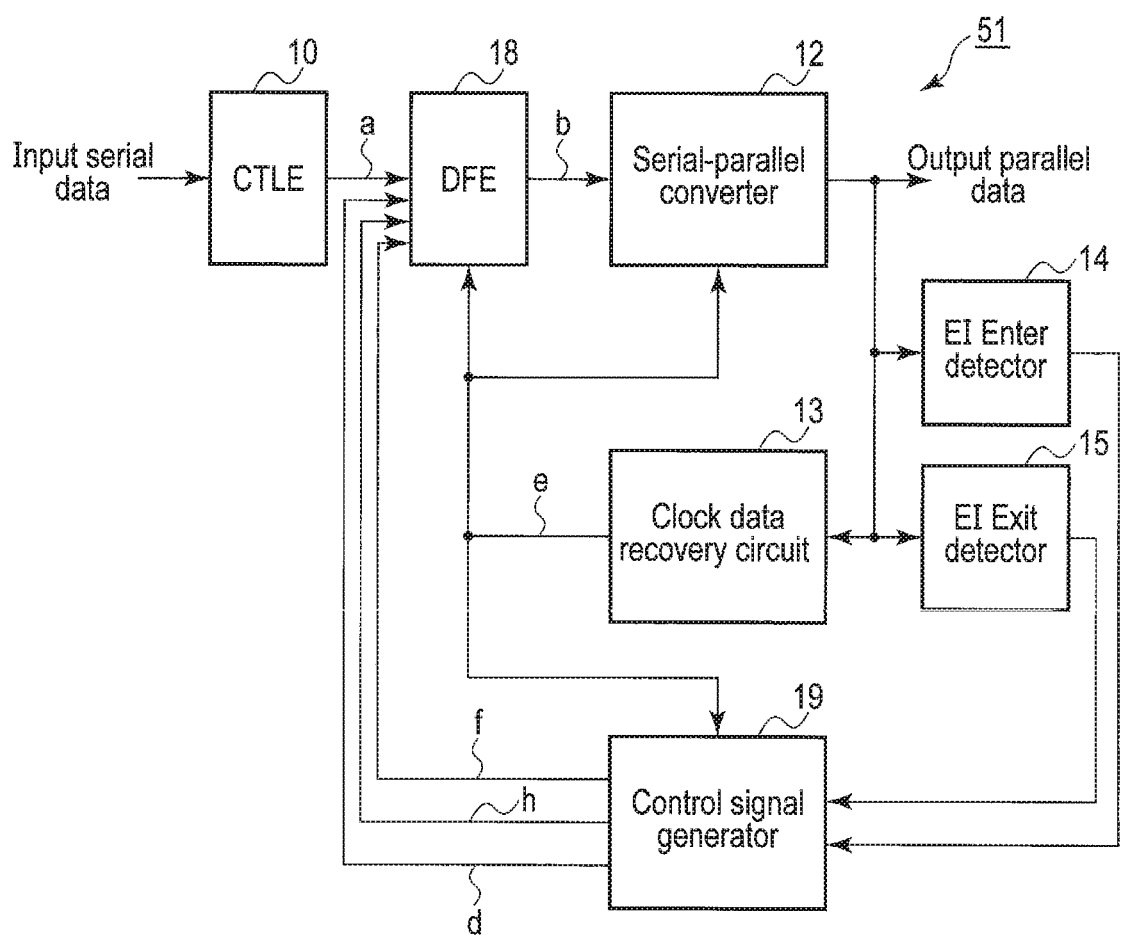
F I G. 9

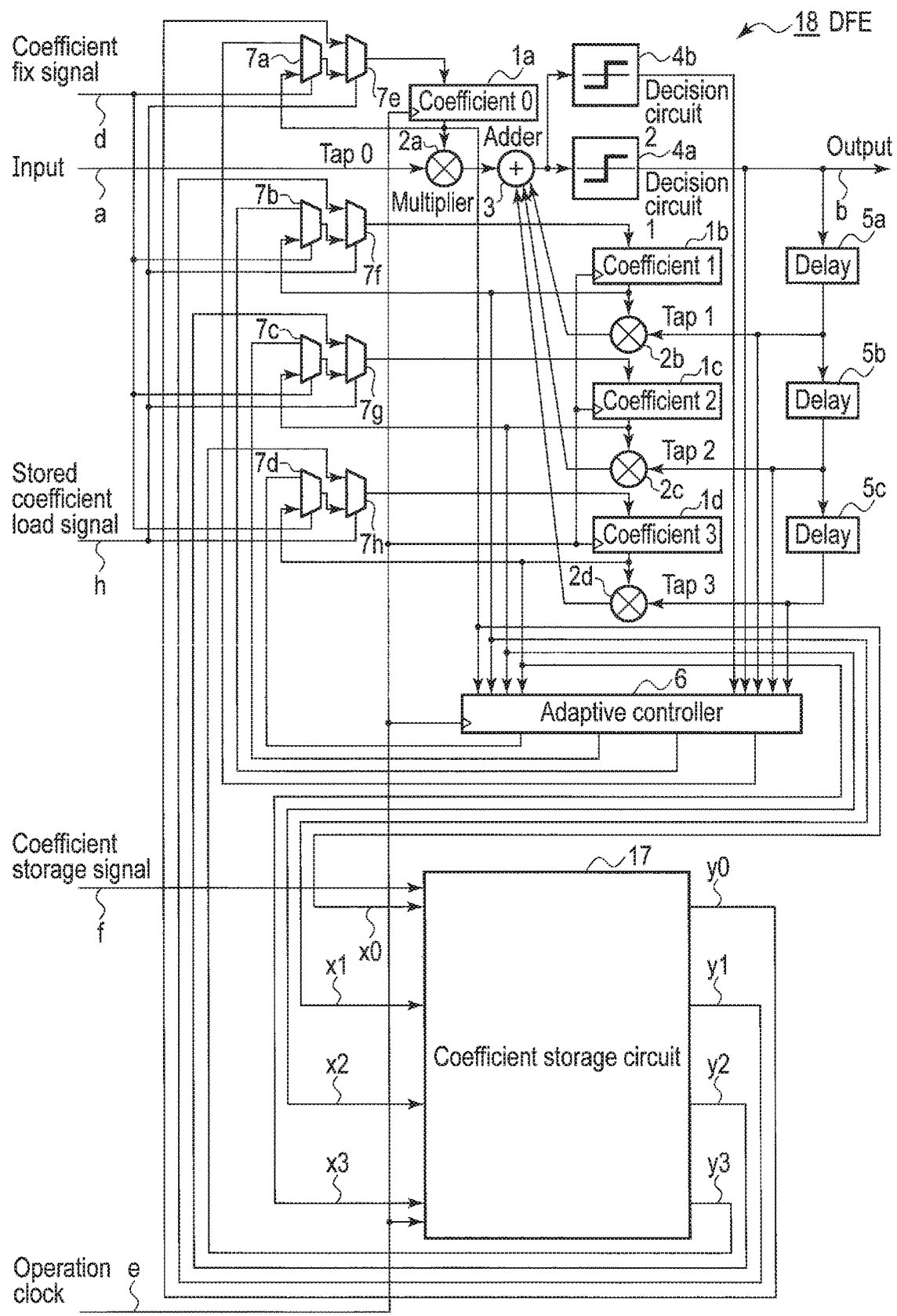
F I G. 10

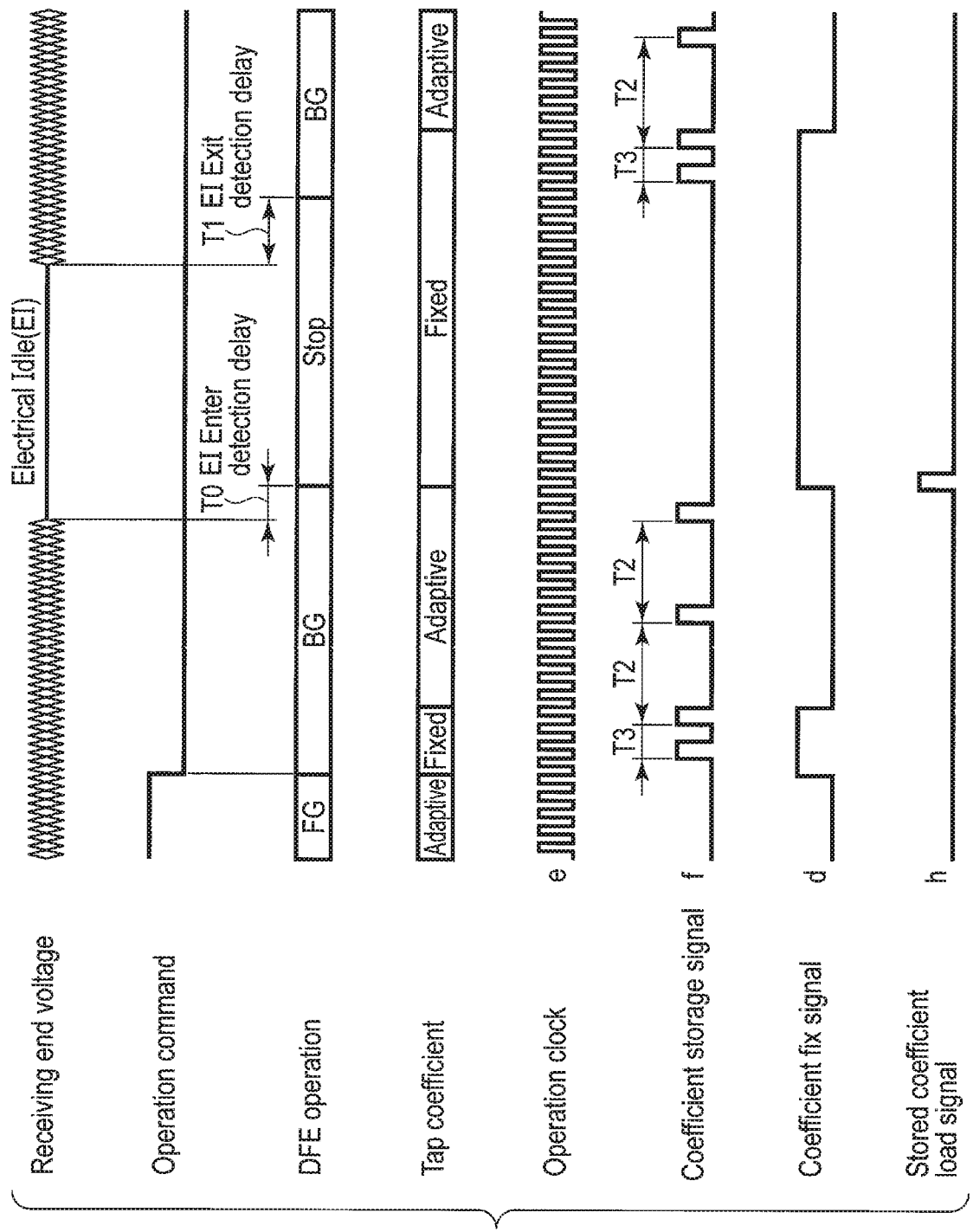
F I G. 12

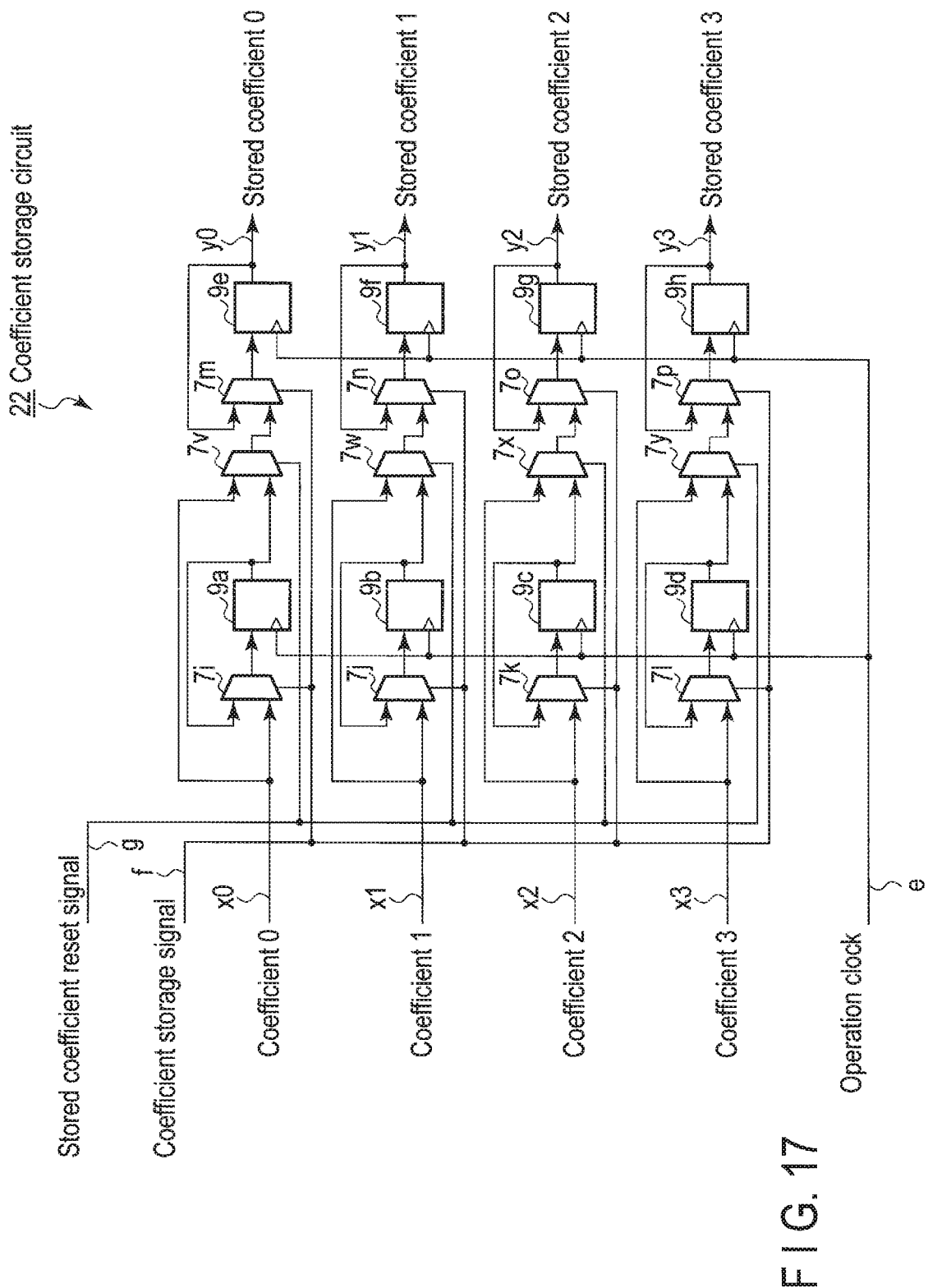
F I G. 17

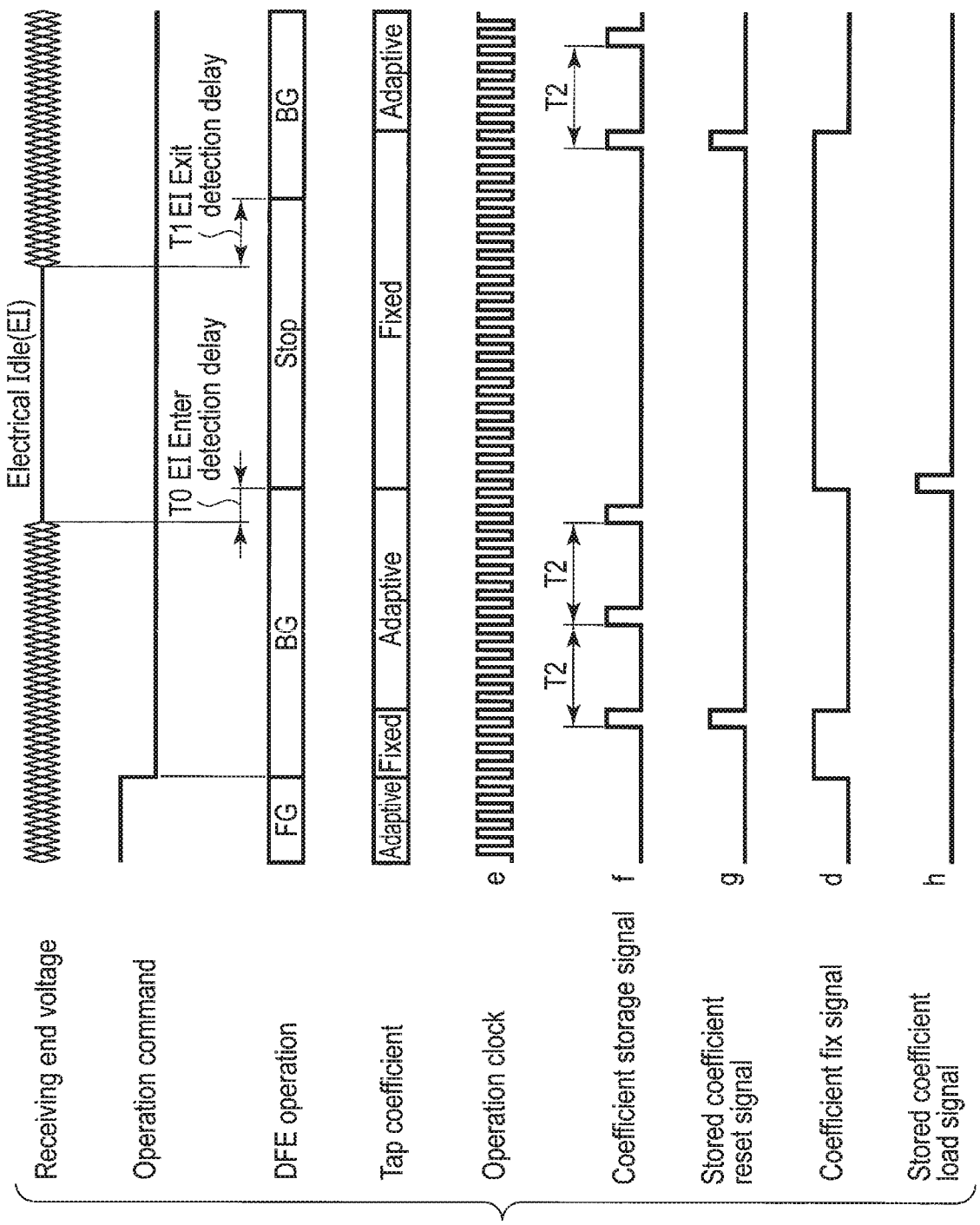
F I G. 18

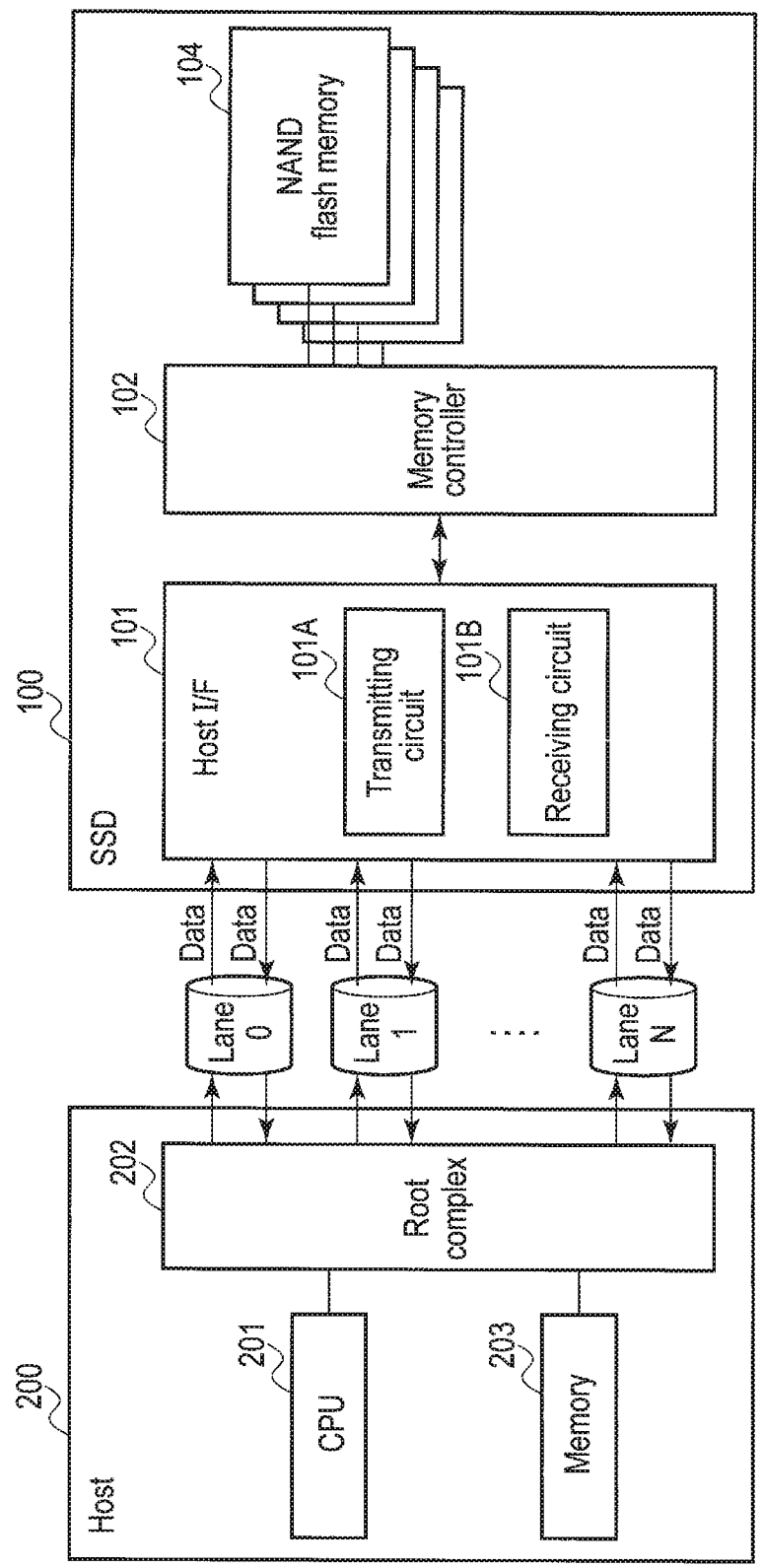
F I G. 20

ELECTRONIC DEVICE AND METHOD OF RECEIVING DATA

CROSS-REFERENCE TO RELATED APPLICATIONS

This application is based upon and claims the benefit of priority from Japanese Patent Application No. 2018-055004, filed Mar. 22, 2018, the entire contents of which are incorporated herein by reference.

FIELD

Embodiments described herein relate generally to an electronic device and a method of receiving data.

BACKGROUND

Recently, wired serial data transmission technologies have been developed and a transmission speed of several tens of gigabits per second (Gb/s) is to be put into practical use in electric transmission lines using metal materials. In the data transmission system, an influence of inter-symbol interference (ISI) should be considered.

The ISI is a phenomenon which results from a delay of a signal wave proceeding in a transmission line and a reflection on a transmission line end. In the ISI, a traveling wave and a reflective wave overlap and a transmission waveform collapses. If the ISI occurs, a probability of erroneously determining a signal level (0, 1) at a receiving end is increased. A bit error rate which is an index of communication conditions becomes thereby worse.

To cancel the ISI, a decision feedback equalizer (DFE) is effective. Specifications of the DFE are designed into PCI Express (registered trademark) (hereinafter abbreviated as PCIe), too, in and after the third generation.

The above-explained DFE operates effectively by adaptively updating a tap coefficient for input data. For this reason, the DFE may make an operation error and give an influence to data communications, during a no-signal period in which no input data is present.

BRIEF DESCRIPTION OF THE DRAWINGS

FIG. 2 is a diagram for explanation of a general DFE effect.

FIG. 5 is a truth table showing an operation of an adaptive controller provided in the DFE according to the first embodiment.

FIG. 6 is another truth table showing the operation of the adaptive controller provided in the DFE according to the first embodiment.

FIG. 9 is a block diagram showing a configuration of a receiving device according to a second embodiment.

FIG. 10 is a diagram showing a configuration of a DFE according to the second embodiment.

FIG. 12 is a timing chart for explanation of an operation of the DFE according to the second embodiment.

FIG. 17 is a diagram showing a configuration of a coefficient storage circuit provided in the DFE according to the third embodiment.

FIG. 18 is a timing chart for explanation of an operation of the DFE according to the third embodiment.

FIG. 20 is a diagram showing an example of applying the receiving device to a storage device as an applied example.

DETAILED DESCRIPTION

Various embodiments will be described hereinafter with reference to the accompanying drawings.

In general, according to one embodiment, an electronic device executes decision feedback-type equalization for input data using a coefficient while updating the tap coefficient. The electronic device includes a first memory cyclically receiving a tap coefficient, holing the tap coefficient received, and cyclically outputting the tap coefficient held, and a second memory receiving the tap coefficient cyclically output from the first memory and holding the tap coefficient received. The tap coefficient cyclically output from the first memory is delayed by at least one cycle than the tap coefficient cyclically received by the first memory. The tap coefficient held in the second memory is used for the decision feedback-type equalization in a no-signal period in which no input data exist.

First Embodiment

Figure 1:
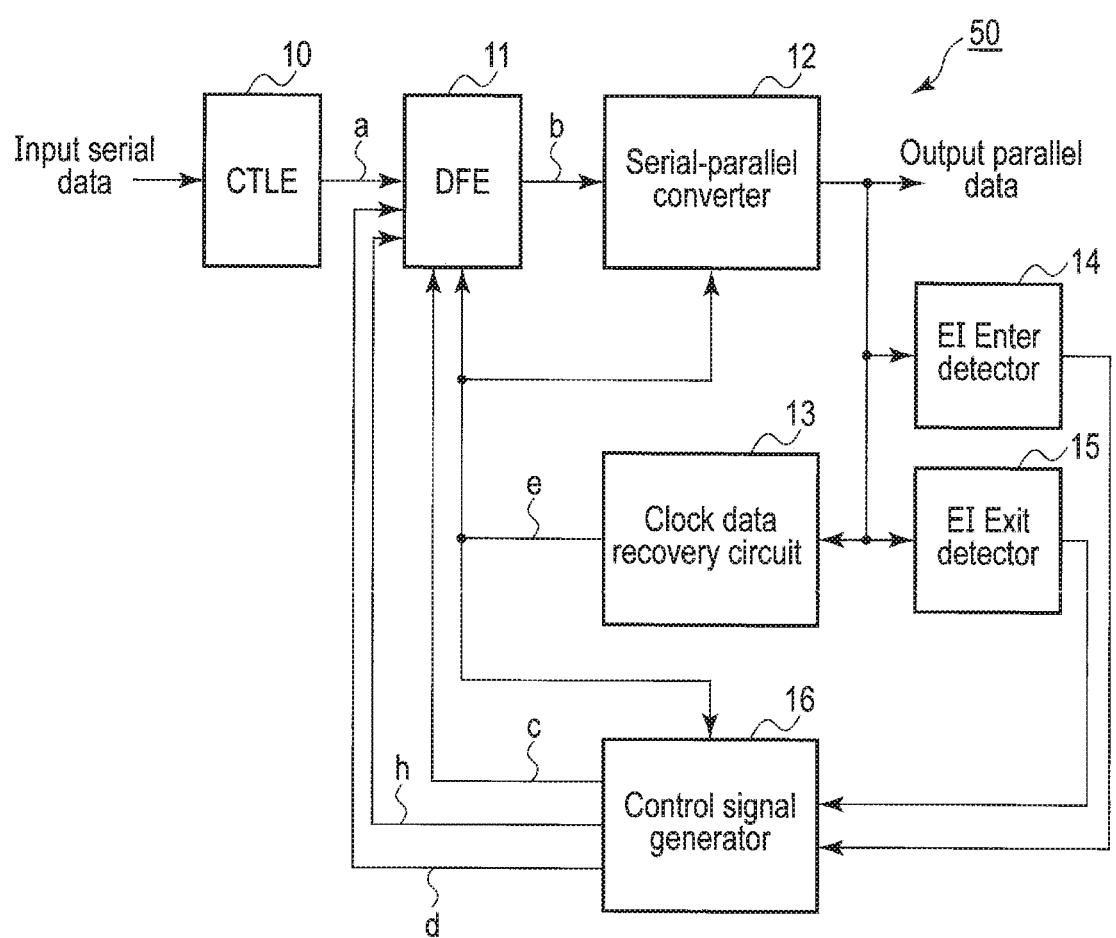
FIG. 1 is a block diagram showing a configuration of a receiving device according to a first embodiment.

FIG. 1 is a block diagram showing a configuration of a receiving device 50 according to a first embodiment.

In the present embodiment, the receiving device 50 is employed for, for example, serial data communications based on a PCIe (TR) standard. The receiving device 50 includes a continuous time linear equalizer (CTLE) 10 and a decision feedback equalizer (DFE) 11 as circuits compensating for input data.

The CTLE 10 wave-shapes the input data (serial data) and supplies the wave-shaped data to the DFE 11. The DFE 11 reduces an influence of inter-symbol interference by executing equalization of a decision feedback-type while adaptively updating at least one tap coefficient for the data wave-shaped by the CTLE 10. A configuration of the DFE 11 will be explained later in detail with reference to FIG. 3.

The receiving device 50 includes a serial-parallel converter 12, a clock data recovery circuit 13, an EI Enter detector 14, an EI Exit detector 15, and a control signal generator 16 as circuits for controlling an operation of the DFE 11.

The serial-parallel converter 12 converts output data b of the DFE 11 into parallel data.

The clock data recovery circuit 13 receives the parallel data output from the serial-parallel converter 12 and generates operation clock e for synchronization among the circuits. The operation clock e is supplied to the DFE 11, the serial-parallel converter 12, and the control signal generator 16.

The EI Enter detector 14 and the EI Exit detector 15 detect a start time and an end time of an electrical idle (EI) which is a no-signal period in the PCIe.

More specifically, in the PCIe, specific data string called electrical idle ordered set (EIOS) is transmitted from an upper layer before the EI period starts, while the specific data string called electrical idle exit ordered set (EIEOS) is transmitted from the upper layer after the EI period is ended.

The EI Enter detector 14 receives the parallel data output from the serial-parallel converter 12, inputs the specific data string of EIOS, and thereby detects the start of EI. The EI Exit detector 15 receives the parallel data output from the serial-parallel converter 12, inputs the specific data string of EIEOS, and thereby detects the end of EI which is the no-signal period.

The control signal generator 16 generates a control signal to control an operation of the DFE 11 and outputs the control signal to the DFE 11, based on timing of the start and the end of EI detected by the EI Enter detector 14 and the EI Exit detector 15.

The control signal includes coefficient storage clock c, coefficient fix signal d, and stored coefficient load signal h. These signals will be explained later in detail with reference to FIG. 7.

To make understanding easier, characteristics of a general DFE will be explained.

The DFE includes a decision circuit which determines whether the signal waveform of the input data is indicative of 0 or 1. The DFE delays signals 0 or 1 output from the decision circuit through a multi-step (tap) delay circuit, multiplies each of the signals by a coefficient (tap coefficient), and feeds back a sum of the values to the decision circuit.

The tap coefficient is adaptively updated in a direction of canceling inter-symbol interference (ISI) of the input data. Updating the tap coefficient is also called "adaptive operation" or "adaptive control".

FIG. 2 is a diagram schematically showing signal waveforms of the input data. FIG. 2 shows the signal waveforms in a case of transmitting, for example, the data string which is 1 at certain time t=0 and 0 at the other times, onto a transmission line with delay and reflection. The horizontal axis is indicative of time, and the vertical axis is indicative of amplitude with the maximum value normalized to 1.

The input data is varied as indicated by a solid line when the DFE is not provided, and valid as indicated by a broken line when the DFE is provided. When the DFE is not provided, the amplitude at time t=1 [UI] is 0.5. UI is an abbreviation of "unit interval", which represents a basic transfer frequency of a 1-bit digital data and is appropriately proportional to the time.

If the input data with amplitude of 0.5 is determined by a decision circuit having a threshold value of 0.5, the probability that the amplitude will be erroneously determined to be 1 becomes higher. In contrast, the amplitude at the same time in a case where the DFE is provided is 0.25 and, even if this is determined by a decision circuit having a threshold value of 0.5, the probability that the amplitude will be erroneously determined to be 1 becomes lower.

The tap coefficient of the DFE is adaptively updated for the input data. In other words, even if gain is varied, negative feedback is applied in a direction of canceling the variation, in circuit characteristics from the receiving end of the transmission line to the determination output. Therefore, the DFE has a characteristic of being hardly influenced by the variation in circuit characteristics. The miniaturization in the semiconductor production process also proceeds as the transmission speed becomes higher, and the communication circuit can easily be influenced by the variation in temperature. Installation of the DFE is therefore effective as a measure against the ISI.

As explained above, however, the DFE operates effectively by adaptively updating the tap coefficient for the input data. For this reason, in a no-signal period in which no input data exist, there is a possibility that the tap coefficient may not be returned to an appropriate value even if the tap coefficient changes in an undesirable direction and the inputting of data is restarted.

In the PCIe, the period of EI, which is a no-signal period, defines an electrical state of the receiving end and is positively used for the reduction in power consumption and the change in communication speed. In addition, in PCIe Gen3, an operation command (RxEqEval) is asserted from an upper layer to the DFE, and the DFE is made to execute the adaptive operation and the tap coefficient is updated during a period of asserting the operation command. In the operation command assertion period, an EI state is not made since a training pattern for adjustment of the tap coefficient is input to the DFE. Therefore, the tap coefficient is not disturbed even if the DFE is made to execute the adaptive operation in the operation command assertion period.

In contrast, general data reception is executed in a period in which the operation command is not asserted, and the EI state is often generated during the data reception. In general, a method of making the DFE execute the adaptive operation in the only operation command assertion period, stopping the operation command assertion period of the DFE in the other periods, and fixing the tap coefficient is employed. In this method, however, the DFE cannot fall into incapability of adaptation in the EI state but, instead, the DFE cannot compensate for the variation in circuit characteristics in the period in which the operation command is not asserted.

A method of making the DFE execute the adaptive operation in periods other than the operation command assertion period will be explained below.

Figure 3:
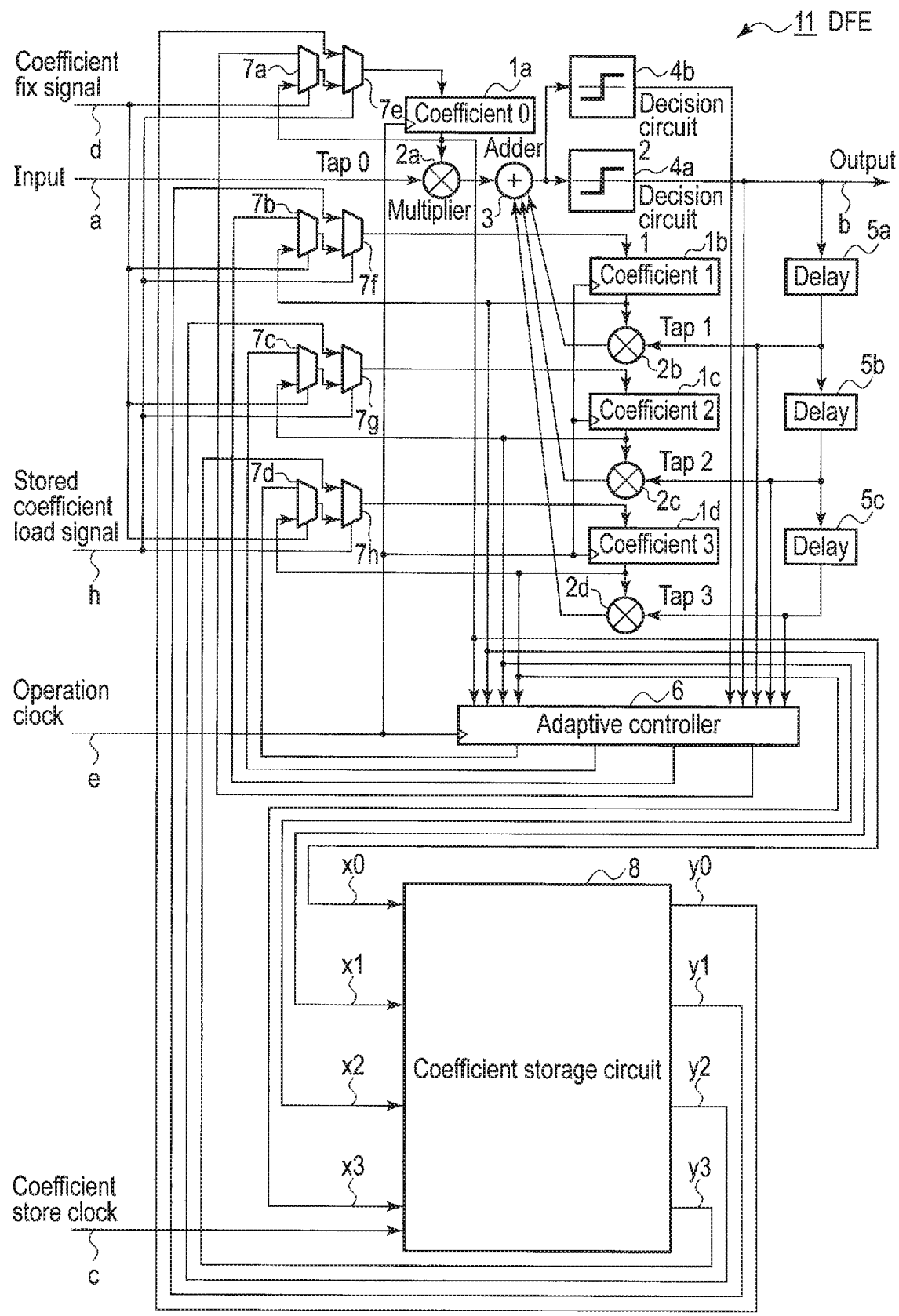
FIG. 3 is a diagram showing a configuration of a DFE according to the first embodiment.

FIG. 3 is a diagram showing a configuration of a DFE 11 according to the first embodiment.

The DFE 11 includes tap registers 1a to 1d, multipliers 2a to 2d, an adder 3, decision circuits 4a and 4b, delay circuits 5a to 5c, an adaptive controller 6, first selectors 7a to 7d, second selectors 7e to 7h, and a coefficient storage circuit 8.

In the figure, signals a to e and h correspond to the signals in FIG. 1, respectively.

The signal a is an input signal which is pre-equalized data (serial data) input to the DFE 11, and the signal b is an output signal which is equalized data (serial data) output from the DFE 11. The signal c is a coefficient storage clock, the signal d is a coefficient fix signal, the signal e is an operation clock, and the signal h is a stored coefficient load signal. The timing and the meanings of the signals will be explained in detail with reference to FIG. 7.

The tap registers 1a to 1d hold the coefficients of taps 0 to 3 to be multiplied by the output data of the respective steps.

The decision circuits 4a and 4b are circuits which determine whether the value of the input data is 0 or 1, and have different threshold values. The threshold value of the decision circuit 4b is set to be higher than the threshold value of the decision circuit 4a. The data which is determined to be 0 or 1 by the decision circuit 4a is supplied to the multipliers 2b to 2d via the delay circuits 5a to 5c of plural steps (three in this example).

The multipliers 2b to 2d multiply the data delayed by the delay circuits 5a to 5c by the coefficients of taps 1 to 3 and supply the data to the adder 3. In contrast, the value obtained by multiplying the input data a by the coefficient of a tap 0 is supplied to the adder 3. A value obtained by summing these values is supplied to the decision circuits 4a and 4b, and the data determined to be 0 or 1 by the decision circuit 4a is finally output to the outside as equalized data b.

The coefficients of taps 0 to 3 are adaptively updated by the adaptive controller 6 (which will be explained with reference to FIG. 5 and FIG. 6). The coefficients of taps 0 to 3 updated by the adaptive controller 6 are held in the tap registers 1a to 1d via the first selectors 7a to 7d and the second selectors 7e to 7h provided on the data input side.

The coefficient storage circuit 8 cyclically inputs the coefficients of taps 0 to 3 held by the tap registers 1a to 1d and outputs the coefficients to the second selectors 7e to 7h provided on the data input side, based on the coefficient storage clock c.

The first selectors 7a to 7d and the second selectors 7e to 7h selectively supply the output of the adaptive controller 6, the output of the coefficient storage circuit 8, or the outputs of the tap registers 1a to 1d to the tap registers 1a to 1d, based on the value of the coefficient fix signal d and the value of the stored coefficient load signal h.

If the stored coefficient load signal h is on a low level, the output of the adaptive controller 6 is selected when the coefficient fix signal d is on a low level, and the outputs of the tap registers 1a to 1d are supplied to the tap registers 1a to 1d when the coefficient fix signal d is on a high level. If the stored coefficient load signal h is on a high level, the outputs (y0 to y3) of the coefficient storage circuit 8 are supplied to the tap registers 1a to 1d irrespective of the value of the coefficient fix signal d.

Figure 4:
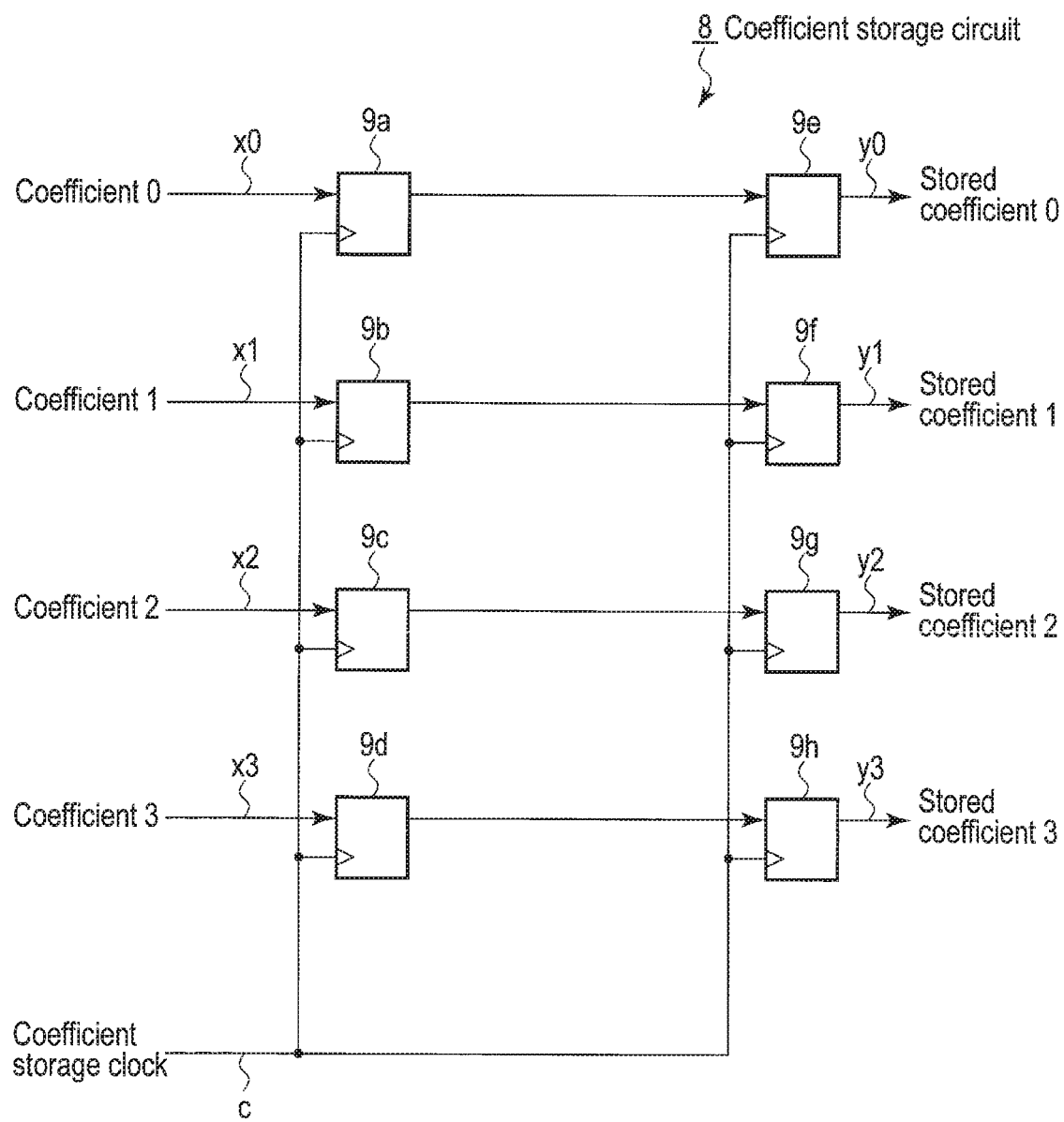
FIG. 4 is a diagram showing a configuration of a coefficient storage circuit provided in the DFE according to the first embodiment.

FIG. 4 is a diagram showing a configuration of the coefficient storage circuit 8.

The coefficient storage circuit 8 includes first registers 9a to 9d and second registers 9e to 9h. The first registers 9a to 9d and the second registers 9e to 9h make cascade connection, respectively, and cyclically hold the coefficients of taps 0 to 3 by the coefficient storage clock c.

More specifically, the first registers 9a to 9d take in (hold) the tap coefficients (x0 to x3) of the tap registers 1a to 1d, respectively, every time the coefficient storage clock c rises.

The second registers 9e to 9h take in the tap coefficients of the first registers 9a to 9d, respectively, every time the coefficient storage clock c rises. The second registers 9e to 9h thereby hold the tap coefficients held by the first registers 9a to 9d with a delay of one cycle of the coefficient storage clock c.

FIG. 5 is a truth table showing an operation of the adaptive controller 6.

The adaptive controller 6 updates the coefficient of the tap 0, based on determination results of the decision circuits 4a and 4b. In this case, as shown in the truth table of FIG. 5, when the value of the decision circuit 4a is 1 and the value of the decision circuit 4b is 0, the adaptive controller 6 updates the coefficient of the tap 0 such that the coefficient increases from the current value. When the value of the decision circuit 4a is 1 and the value of the decision circuit 4b is 1, the adaptive controller 6 updates the coefficient of the tap 0 such that the coefficient decreases from the current value. If the value of the decision circuit 4a is 0, the adaptive controller 6 does not update the coefficient of the tap 0 irrespective of the determination result of the decision circuit 4b.

FIG. 6 is another truth table showing the operation of the adaptive controller 6.

For the coefficients other than the tap 0, the adaptive controller 6 updates each of the tap coefficients, based on the determination results of the decision circuits 4a and 4b and the output value of each of the taps. In FIG. 6, n is an integer of 1 or more. Even if the tap number increases, the coefficient of a tap n is updated as shown in the truth table of FIG. 6 when n is one or more.

Figure 7:
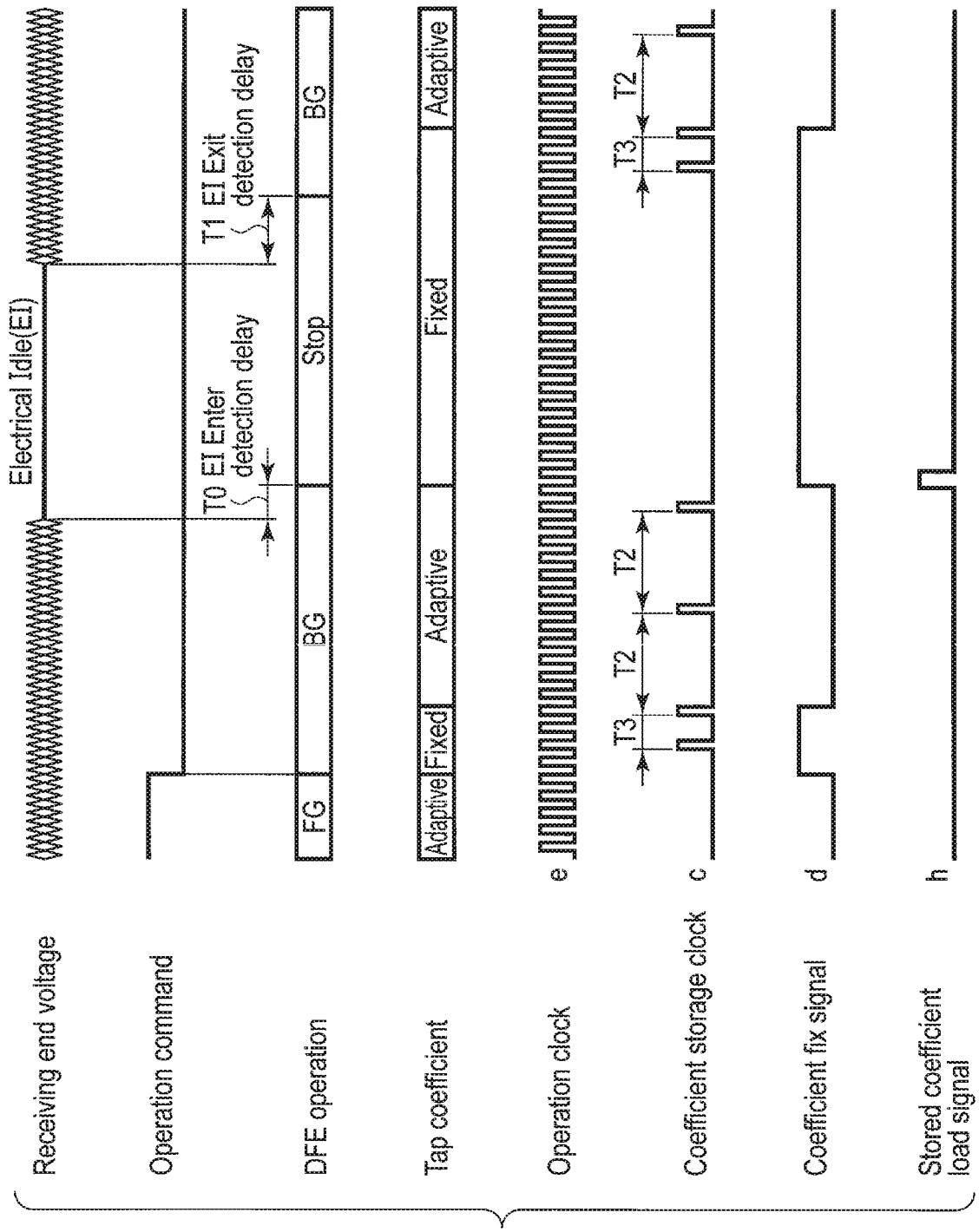
FIG. 7 is a timing chart for explanation of an operation of the DFE according to the first embodiment.

FIG. 7 is a timing chart for explanation of the operation of the DFE 11.

In the PCIe Gen3, the period of adaptation of the DFE is especially defined as a training period, as explained above. In the training period, not the general data, but a training pattern for adjustment of the DFE tap coefficient is input.

Executing the adaptive operation (operation of updating the tap coefficient) by the DFE in the training period is called a foreground operation (hereinafter referred to as FG operation), which means explicitly operating. After the training period is ended, a rule of adjustment of the DFE tap coefficient does not exist. Executing the adaptive operation (operation of updating the tap coefficient) by the DFE in this period is called a background operation (hereinafter referred to as BG operation), which means inexplicitly operating.

The FG operation and the BG operation are changed in response to the presence and absence of the operation command supplied from the upper layer. In addition, the BG operation is stopped and an appropriate tap coefficient at this time is held in the EI period which is the no-signal period. After the EI period is ended, the BG operation is restarted.

To execute such an operation, the start of the EI period (EI Enter) and the end of the EI period (EI Exit) need to be detected. As explained above, in the PCIe, a system for this is determined, and the specific data string called ETOS is transmitted from the upper layer before the EI period starts, and the specific data string called ETEOS is transmitted from the upper layer after the EI period is ended.

However, a delay time exists in the inner circuits between the input end of the receiving device 50, and the EI Enter detector 14 and the EI Exit detector 15. In FIG. 7, an inner delay time is represented as T0 and T1. The BG operation is continued at only T0 even after the receiving end becomes EI. In addition, when EI is ended, the BG operation is restarted with a delay of T1.

Thus, since the inner delay exists, inappropriate tap coefficient may occur in the delay time T0 and the DFE 11 may make an operation error even if the EI period is detected. To prevent this, in the first embodiment, the operation of taking in the tap coefficient for the coefficient storage circuit 8 is controlled by using the coefficient storage clock c and the tap coefficient is fixed to the tap coefficient updated before the delay time T0 in the EI state.

The timing and meanings of the signals including the coefficient storage clock c are as follows.

The operation clock e is a signal for making synchronization among the circuits, and rises cyclically and sequentially.

The coefficient storage clock c is a signal for storing the tap coefficient in the coefficient storage circuit 8. The coefficient storage clock c rises cyclically while the DFE 11 adaptively controls the tap coefficient in the BG operation. In the figure, T2 and T3 are cycles of rise of the coefficient storage clock c.

The coefficient fix signal d is a signal for fixing the tap coefficient. The coefficient fix signal d rises to a high level at the timing at which the period of asserting the operation command is ended, and falls to a low level after the tap coefficient for two cycles of the coefficient storage clock c is stored in the coefficient storage circuit 8. In addition, the coefficient fix signal d rises to a high level when EI start (EI Enter) is detected, and falls to a low level after EI end (EI Exit) is detected and the tap coefficient for two cycles of the coefficient storage clock c is stored in the coefficient storage circuit 8.

The stored coefficient load signal h is a signal for loading the tap coefficient to the tap registers 1*a* to 1*d*. The stored coefficient load signal h becomes high level for one cycle of the operation clock e when EI start (EI Enter) is detected, and then held to a low level.

In this configuration, when the period of asserting the operation command is ended and updating the tap coefficient is controlled by the BG operation, the coefficients of taps 0 to 3 which are output from the tap registers 1*a* to 1*d* are held in the first registers 9*a* to 9*d* at the rise edge of the coefficient storage clock c, in the coefficient storage circuit 8.

In addition, the coefficients of taps 0 to 3 which are output from the first registers 9*a* to 9*d* are held in the second registers 9*e* to 9*h* with a delay of one cycle (delay of one clock of the coefficient storage clock c). The coefficients of taps 0 to 3 held in the second registers 9*e* to 9*h* are stored in the tap registers 1*a* to 1*d* via the second selectors 7*e* to 7*h* provided on the data input side.

As shown in FIG. 7, the coefficient storage clock c which determines the cycle of taking in the coefficient rises in cycles T2 and T3 in the BG operation. Rise cycle T2 of the coefficient storage clock c is pre-set to be longer than EI start detection delay time T0. Thus, even in the EI state during the BG operation, the tap coefficients updated at this time (inappropriate tap coefficients) does not need to be taken in or at least one of them needs only to be taken in the first registers 9*a* to 9*d*.

At this time, the tap coefficients held by the second registers 9*e* to 9*h* are the tap coefficients obtained before EI start detection delay time T0, and have appropriate values. Therefore, when the EI start is detected internally, if the coefficient fix signal d and the stored coefficient load signal h are output and the tap coefficients held in the second registers 9*e* to 9*h* are fixed to the tap registers 1*a* to 1*d* via the second selectors 7*e* to 7*h*, the operation error of the DFE 11 in the EI period can be prevented.

In addition, the tap coefficients obtained in EI start detection delay time T0 may remain in the first registers 9*a* to 9*d*, after the end of the EI period. Since the EI state actually occurs in period T0, there is high possibility that the tap coefficients may be abnormal values.

To cancel the tap coefficients, when the DFE 11 restarts the operation of updating the tap coefficients (when the FG operation is changed to the BG operation or the EI state is changed to the BG operation), the coefficient storage clock c rises twice in cycle T3 in the state in which the tap coefficients of the tap registers 1*a* to 1*d* are fixed (the coefficient fix signal d is on a high level).

Thus, the tap coefficients held in the first registers 9*a* to 9*d* and the second registers 9*e* to 9*h* are rewritten to the fixed tap coefficients of the tap registers 1*a* to 1*d*. Therefore, even if the tap coefficients obtained in the EI state remain in the coefficient storage circuit 8, the operation of updating the tap coefficients can be restarted after canceling the obtained tap coefficients. In this case, to cancel unnecessary tap coefficients as soon as possible, T3 is preferably pre-set to be shorter than T2.

Figure 8:
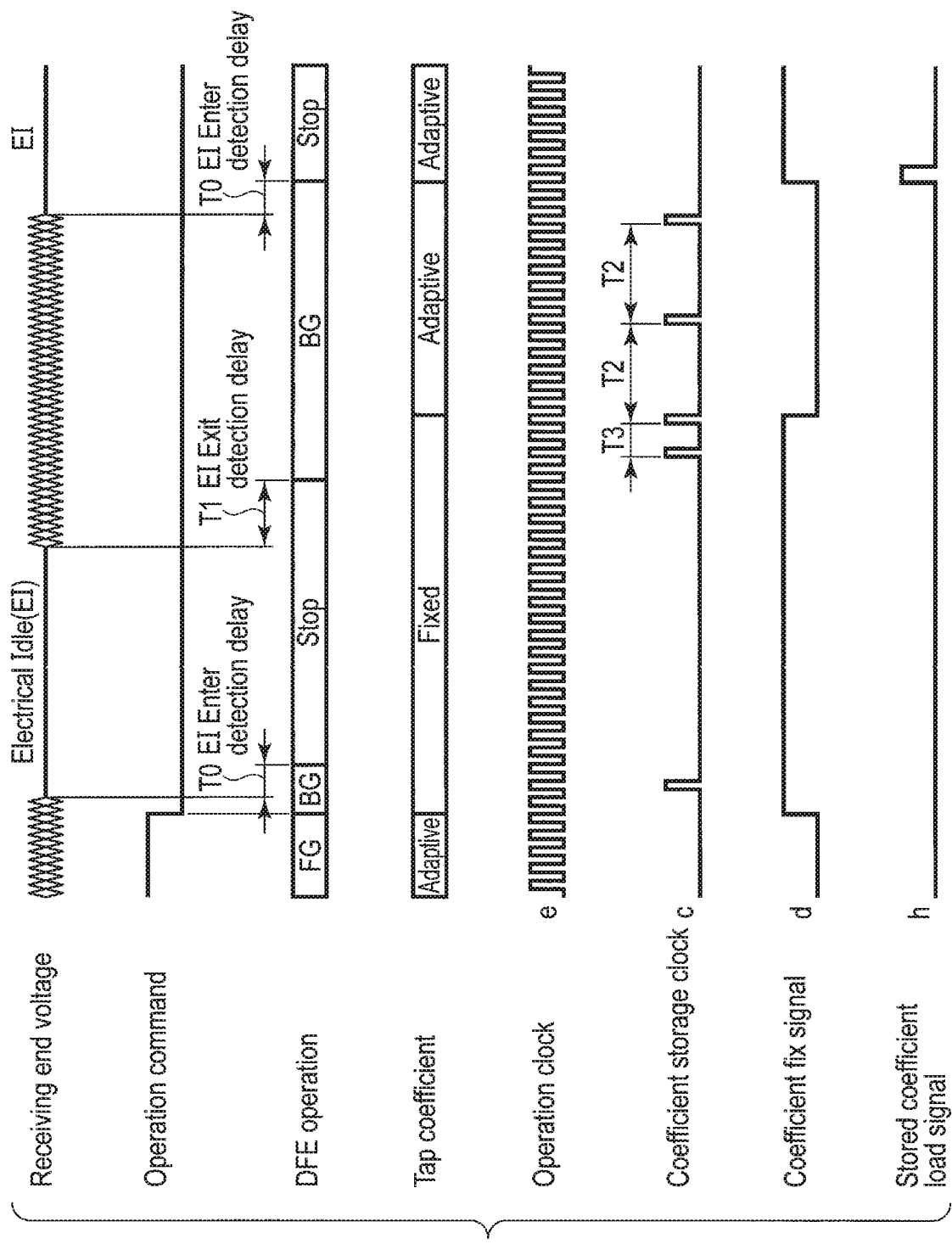
FIG. 8 is another timing chart for explanation of the operation of the DFE according to the first embodiment.

FIG. 8 shows another timing chart.

In the example shown in FIG. 8, after the end of FG, the EI start is detected before the tap coefficients are stored in the coefficient storage circuit 8. In this case, the stored coefficient load signal h remains on a low level and does not rise. Thus, the tap coefficients held in the tap registers 1*a* to 1*d* at the end of FG can be fixed during the EI period. Even if the operation is BG before detecting the EI start, the stored coefficient load signal h remains on a low level and the values of the tap registers 1*a* to 1*d* are not changed.

The configuration of the DFE 11 of taps 0 to 3 shown in FIG. 3 is a mere example, and the tap number may be increased or decreased. In addition, for example, a tap 3 may not be provided or taps 2 and 3 may not be provided.

The coefficient storage circuit 8 shown in FIG. 4 is also a mere example, and the number of cascade-connected registers cyclically holding the tap coefficients may be two or more.

Thus, according to the first embodiment, even if the EI state occurs during the BG operation, the tap coefficients can be fixed to the tap coefficients held before detection delay time T0, in the configuration of cyclically holding the tap coefficients in at least two cascade-connected registers in cycle T2 set to be longer than EI start detection delay time T0 during the BG operation. Therefore, even if the DFE is adaptively operated during the BG operation except the operation command period, the operation error of the DFE in the EI state can be prevented and the high-reliability data communications can be implemented.

In addition, since the DFE can be adaptively operated in the periods other than the operation command period, the embodiment can compensate for the variation in circuit characteristics which is caused by temperature drift and the like.

Second Embodiment

Next, Second embodiment will be explained.

FIG. 9 is a block diagram showing a configuration of a receiving device 51 according to a second embodiment. This embodiment is different from the first embodiment with respect to a configuration of a DFE 18 employed in a receiving device 51. In addition, the control signals output from a control signal generator 19 to the DFE 18 include coefficient storage signal f other than coefficient fix signal d and stored coefficient load signal h.

FIG. 10 is a diagram showing a configuration of the DFE 18.

In the second embodiment, the DFE 18 includes tap registers 1*a* to 1*d*, multipliers 2*a* to 2*d*, an adder 3, decision circuits 4*a* and 4*b*, delay circuits 5*a* to 5*c*, an adaptive controller 6, first selectors 7*a* to 7*d*, second selectors 7*e* to 7*h*, and a coefficient storage circuit 17. The tap registers 1*a* to 1*d*, multipliers 2*a* to 2*d*, an adder 3, decision circuits 4*a* and 4*b*, delay circuits 5*a* to 5*c*, an adaptive controller 6, first selectors 7*a* to 7*d*, second selectors 7*e* to 7*h*, are the same as those of the first embodiment shown in FIG. 3.

The coefficient storage circuit 17 takes in the coefficients of taps 0 to 3 held by the tap registers 1*a* to 1*d* and outputs the coefficients to the second selectors 7*e* to 7*h* provided on the data input side, based on the operation clock e and the coefficient storage signal f.

The first selectors 7*a* to 7*d* and the second selectors 7*e* to 7*h* selectively supply the output of the adaptive controller 6, the output of the coefficient storage circuit 17, or the outputs of the tap registers 1a to 1d to the tap registers 1a to 1d, based on the value of the coefficient fix signal d and the value of the stored coefficient load signal h.

If the stored coefficient load signal h is on a low level, the output of the adaptive controller 6 is selected when the coefficient fix signal d is on a low level, and the outputs of the tap registers 1a to 1d are supplied to the tap registers 1a to 1d when the coefficient fix signal d is on a high level. If the stored coefficient load signal h is on a high level, the outputs (y0 to y3) of the coefficient storage circuit 17 are supplied to the tap registers 1a to 1d irrespective of the value of the coefficient fix signal d.

Figure 11:
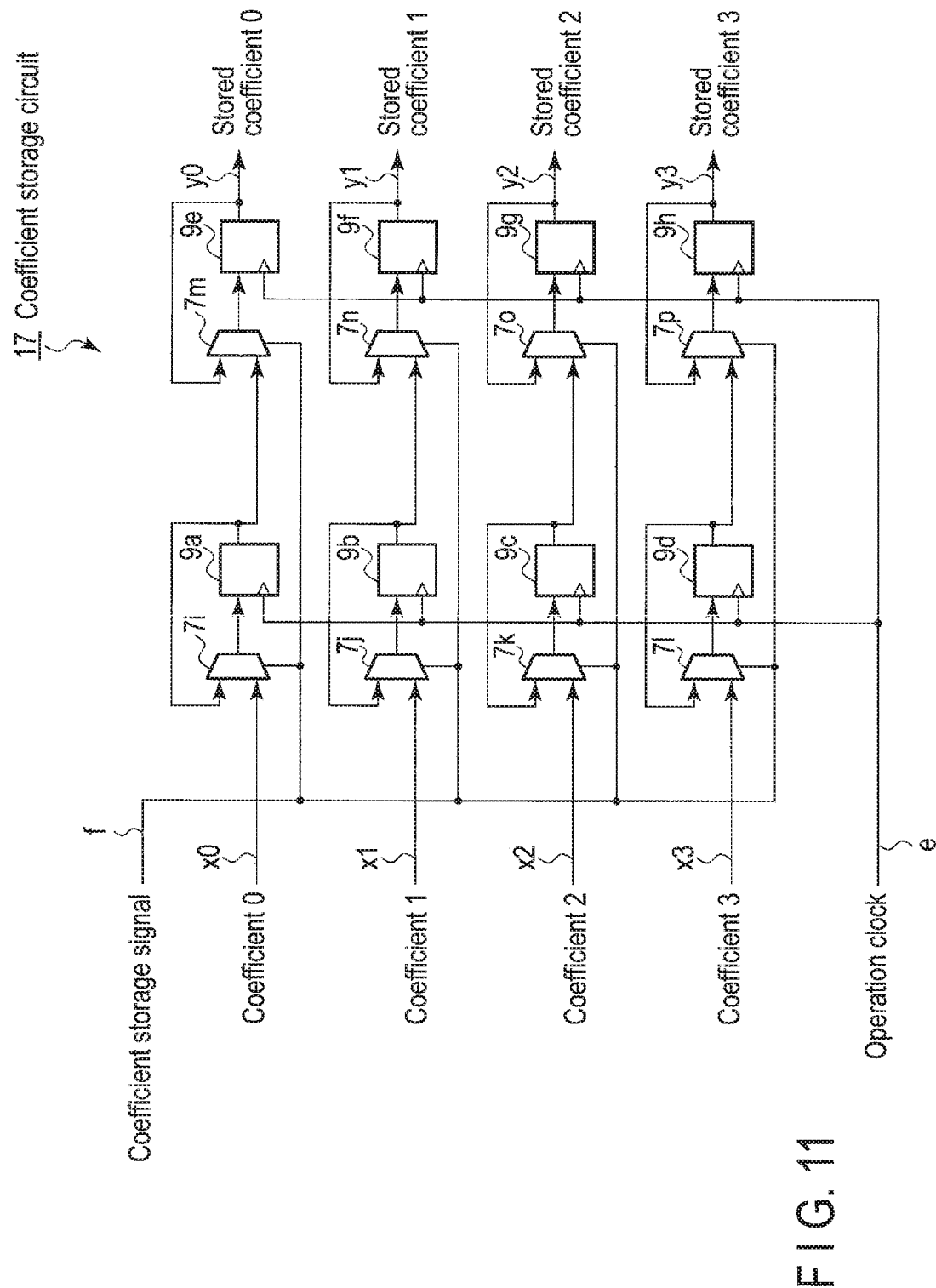
FIG. 11 is a diagram showing a configuration of a coefficient storage circuit provided in the DFE according to the second embodiment.

FIG. 11 is a diagram showing a configuration of the coefficient storage circuit 17.

The coefficient storage circuit 17 includes first registers 9a to 9d, second registers 9e to 9h, and two groups of selectors 7i to 7l and 7m to 7p provided to correspond to the registers. The selectors of one of the groups are cascade-connected.

The tap coefficients (x0 to x3) of the tap registers 1a to 1d are input to the first registers 9a to 9d via the selectors 7i to 7l, and the tap coefficients of the first registers 9a to 9d are input to the second registers 9e to 9h via the selectors 7m to 7p.

Every time the operation clock e rises, the first registers 9a to 9d and the second registers 9e to 9h take in the tap coefficients supplied to the respective registers. When the coefficient storage signal f is on a low level, the tap coefficients held in the registers 9a to 9h are fed back to their inputs via the selectors 7i to 7p, and their contents are not therefore changed.

In contrast, when the coefficient storage signal f is on a high level, the tap coefficients (x0 to x3) of the tap registers 1a to 1d are supplied to the first registers 9a to 9d via the selectors 7i to 7l. The tap coefficients of the first registers 9a to 9d are supplied to the second registers 9e to 9h via selectors 7m to 7p.

If the operation clock e rises in the state in which the coefficient storage signal f is on a high level, the first registers 9a to 9d take in the tap coefficients of the tap registers 1a to 1d and the second registers 9e to 9h take in the tap coefficients of the first registers 9a to 9d.

FIG. 12 is a timing chart for explanation of the operation of the DFE 18.

The FG operation and the BG operation are changed in response to the presence and absence of the operation command supplied from the upper layer. In addition, the BG operation is stopped and an appropriate tap coefficient at this time is held in the EI period which is the no-signal period. After the EI period is ended, the BG operation is restarted.

Operation clock e, coefficient fix signal d, and stored coefficient load signal h are the same as those of the first embodiment.

In the second embodiment, a coefficient storage signal f is used instead of a coefficient storage clock c, as a signal for storing a tap coefficient in the coefficient storage circuit 17. The coefficient storage signal f rises cyclically while the DFE 18 adaptively controls the tap coefficient in the BG operation. In the figure, T2 and T3 are cycles of rise of the coefficient storage clock f.

The coefficient storage circuit 17 according to the second embodiment is configured to take coefficients of taps 0 to 3 in the first registers 9a to 9d and the second registers 9e to 9h via the selectors 7i to 7l and 7m to 7h, as shown in FIG. 11.

When the coefficient storage signal f is on a high level, the selectors 7i to 7l and 7m to 7h operate to take the tap coefficients in the first registers 9a to 9d and the second registers 9e to 9h.

More specifically, when the coefficient storage signal f is on a high level, the selectors 7i to 7l select the coefficients of taps 0 to 3 which are output from the tap registers 1a to 1d and take the coefficients in the first registers 9a to 9d. When the coefficient storage signal f is on a high level, the selectors 7m to 7p select the coefficients of taps 0 to 3 which are output from the tap registers 9a to 9d and take the coefficients in the second registers 9e to 9h.

By repeating the shift operation, the coefficients of taps 0 to 3 are cyclically held in the first registers 9a to 9d and the second registers 9e to 9h of the coefficient storage circuit 17. The coefficients of taps 0 to 3 held in the second registers 9e to 9h are stored in the tap registers 1a to 1d via the second selectors 7e to 7h provided on the data input side.

As shown in FIG. 12, the coefficient storage signal f which determines the cycle of taking in the coefficient rises in cycles T2 and T3 in the BG operation. Rise cycle T2 of the coefficient storage signal f is pre-set to be longer than EI start detection delay time T0. Thus, even in the EI state during the BG operation, the tap coefficients updated at this time (inappropriate tap coefficients) does not need to be taken in or at least one of them needs only to be taken in the first registers 9a to 9d, similarly to the first embodiment.

At this time, the tap coefficients held by the second registers 9e to 9h are the tap coefficients obtained before EI start detection delay time T0, and have appropriate values. Therefore, when the EI start is detected internally, if the coefficient fix signal d and the stored coefficient load signal h are output and the tap coefficients held in the second registers 9e to 9h are fixed to the tap registers 1a to 1d via the second selectors 7e to 7h, the operation error of the DFE 18 in the EI period can be prevented.

In addition, the tap coefficients obtained in EI start detection delay time T0 may remain in the first registers 9a to 9d, after the end of the EI period. Since the EI state actually occurs in period T0, there is high possibility that the tap coefficients may be abnormal values.

To cancel the tap coefficients, in the second embodiment, when the DFE 18 restarts the operation of updating the tap coefficients (when the FG operation is changed to the BG operation or the EI state is changed to the BG operation), the coefficient storage signal f rises twice in cycle T3 in the state in which the tap coefficients of the tap registers 1a to 1d are fixed (the coefficient fix signal d is on a high level).

Thus, the tap coefficients already held in the first registers 9a to 9d and the second registers 9e to 9h are rewritten to the fixed tap coefficients of the tap registers 1a to 1d. Therefore, even if the tap coefficients obtained in the EI state remain in the coefficient storage circuit 17, the operation of updating the tap coefficients can be restarted after canceling the obtained tap coefficients. In this case, to cancel unnecessary tap coefficients as soon as possible, T3 is preferably pre-set to be shorter than T2.

Similarly to the timing shown in FIG. 8, if the EI start is detected before the tap coefficients are stored in the coefficient storage circuit 17 after the end of FG, the stored coefficient load signal h remains on a low level and the values of the tap registers 1a to 1d are not changed. Even if the operation is BG before detecting the EI start, the stored coefficient load signal h remains on a low level and the values of the tap registers 1a to 1d are not changed.

Figure 13:
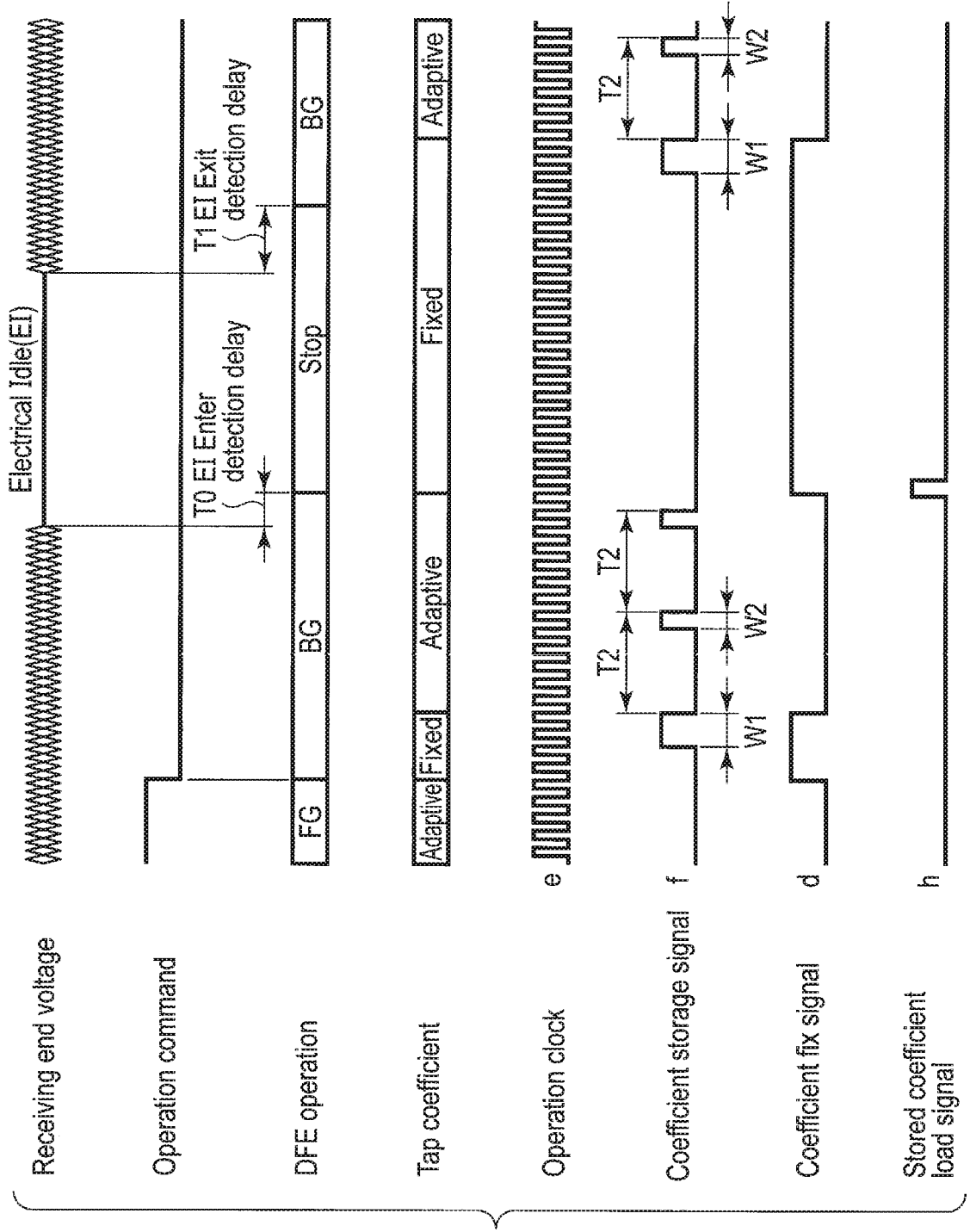
FIG. 13 is another timing chart for explanation of the operation of the DFE according to the second embodiment.

FIG. 13 shows another timing chart.

In the example shown in FIG. 12, when the DFE 18 restarts the operation of updating the tap coefficients, the coefficient storage signal f raises twice in cycle T3, to cancel an inappropriate tap coefficient from the first registers 9a to 9d and the second registers 9e to 9h of the coefficient storage circuit 17.

Instead of raising the coefficient storage signal f twice in cycle T3, the pulse width of the coefficient storage signal f may be set to W1 (first pulse width) corresponding to two or more of the rise cycle of the operation clock e, when restarting the operation of updating the tap coefficients (changing the FG operation to the BG operation or changing the EI state to the BG operation), as shown in FIG. 13. At the other timing of the BG period, the pulse width of the coefficient storage signal f may be set to W2 (second pulse width) corresponding to one cycle of the operation clock e.

By thus setting the pulse width of the coefficient storage signal f to W1, the two-time tap coefficient is taken in the first registers 9a to 9d and the second registers 9e to 9h in synchronization of the operation clock e, and an unnecessary tap coefficient held before can be therefore canceled.

The configuration of the DFE 18 of taps 0 to 3 shown in FIG. 10 is a mere example, and the tap number may be increased or decreased. In addition, for example, a tap 3 may not be provided or taps 2 and 3 may not be provided.

The coefficient storage circuit 17 shown in FIG. 11 is also a mere example, and the number of cascade-connected registers cyclically holding the tap coefficients may be two or more.

Thus, according to the second embodiment, the tap coefficients held before T0 can be fixed even in the EI state in the BG operation, similarly to the first embodiment. Therefore, even if the DFE is adaptively operated during the BG operation except the operation command period, the operation error of the DFE in the EI state can be prevented and the high-reliability data communications can be implemented.

Modified Example

Figure 14:
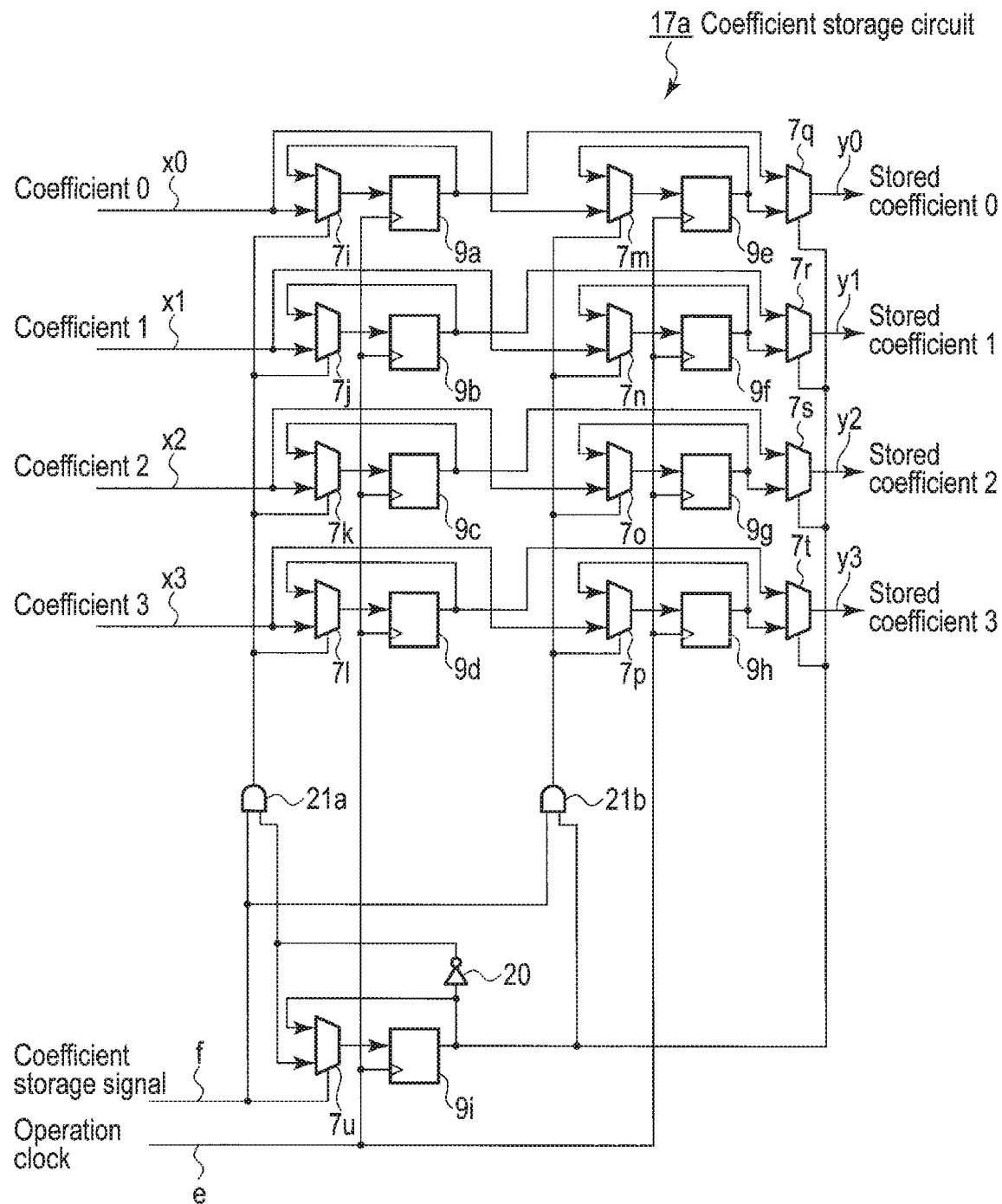
FIG. 14 is a diagram showing an inner configuration of another coefficient storage circuit as a modified example of the second embodiment.

FIG. 14 shows another inner configuration of a coefficient storage circuit 17a as a modified example of the second embodiment. In the figure, 7i to 7u are selectors, 9a to 9i are registers, 20 is an inverter, and 21a and 21b are AND gates.

The tap coefficients (x0 to x3) of the tap registers 1a to 1d shown in FIG. 14 are input to the first registers 9a to 9d via the selectors 7i to 7l, and also input to the second registers 9e to 9h in parallel via the selectors 7m to 7p. The tap coefficients of the first registers 9a to 9d and the tap coefficients of the second registers 9e to 9h are output to the outside via the selectors 7q to 7t, as y0 to y3.

According to the configuration, the first registers 9a to 9d and the second registers 9e to 9h are connected parallel, and the coefficient storage signal f is supplied to the selectors 7i to 7l, the selectors 7m to 7h, and the selectors 7q to 7t via a selector 7u, a register 9i, an inverter 20, and AND gates 21a and 21b. In this configuration, too, the coefficients of taps 0 to 3 are cyclically held in the first registers 9a to 9d and second registers 9e to 9h, at the timing shown in FIG. 12.

Third Embodiment

Next, Third embodiment will be explained.

Figure 15:
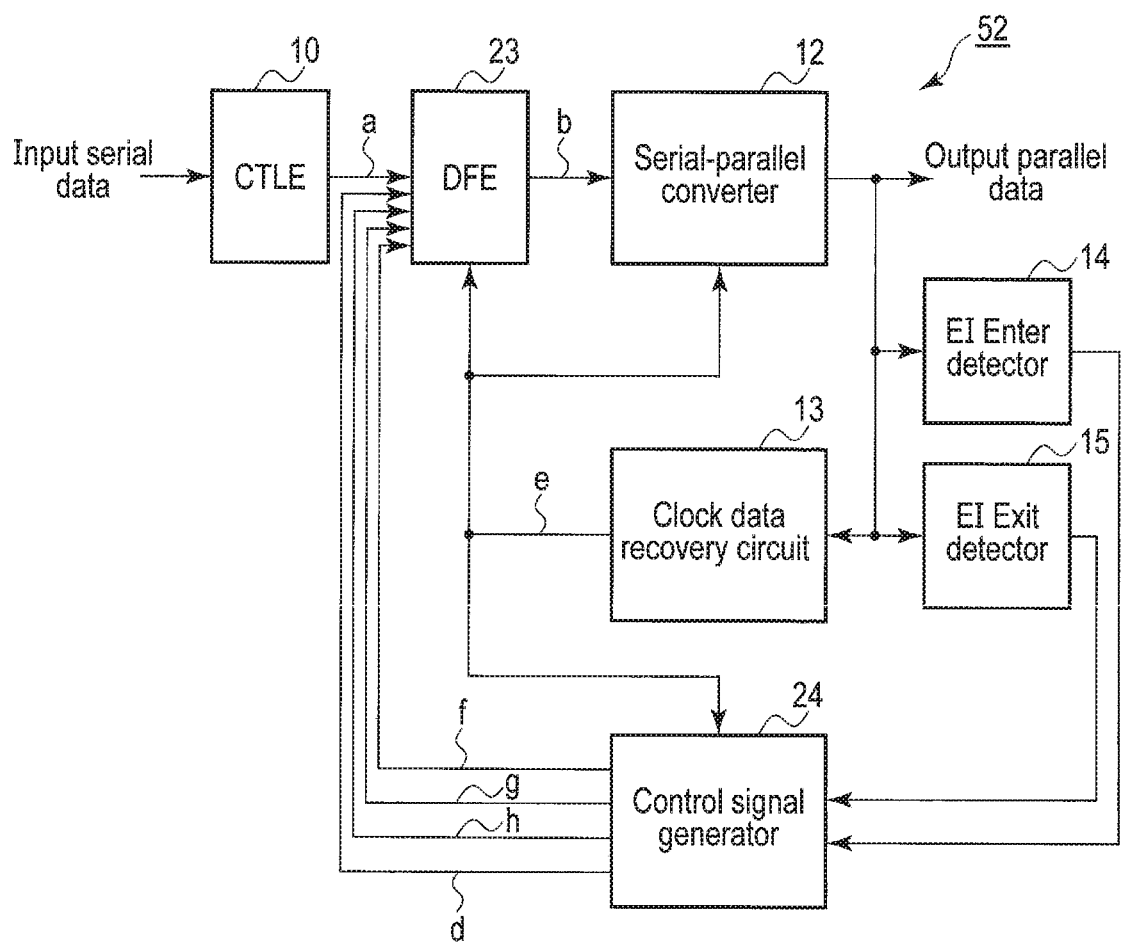
FIG. 15 is a block diagram showing a configuration of a receiving device according to a third embodiment.

FIG. 15 is a block diagram showing a configuration of a receiving device 52 according to a third embodiment. This embodiment is different from the first embodiment and the second embodiment with respect to a configuration of a DFE 23 employed in the receiving device 52. In addition, the control signals output from a control signal generator 24 to the DFE 23 include coefficient storage signal f and stored coefficient reset signal g other than coefficient fix signal d and stored coefficient load signal h.

Figure 16:
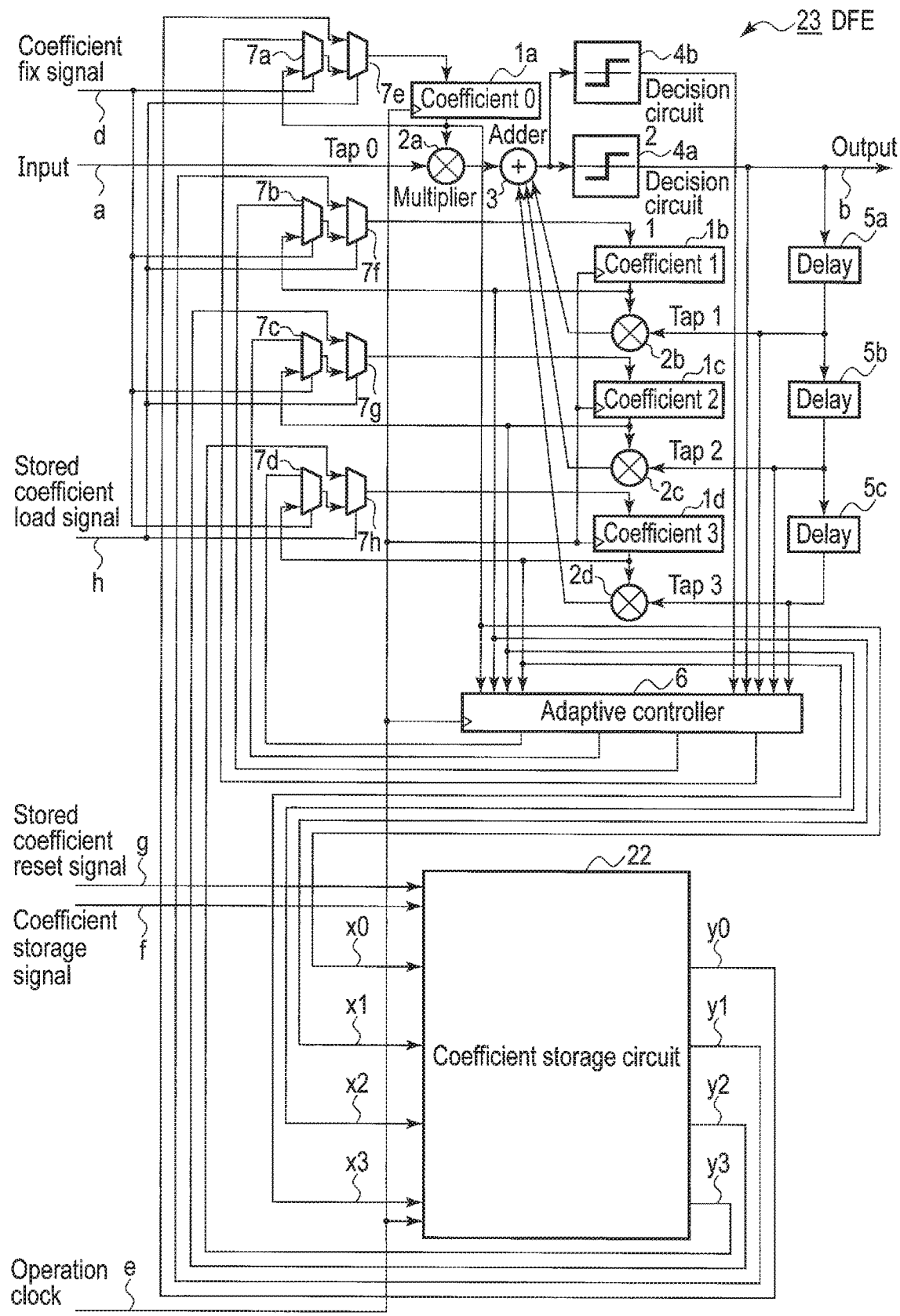
FIG. 16 is a diagram showing a configuration of a DFE according to the third embodiment.

FIG. 16 is a diagram showing a configuration of the DFE 23.

In the third embodiment, the DFE 23 includes tap registers 1a to 1d, multipliers 2a to 2d, an adder 3, decision circuits 4a and 4b, delay circuits 5a to 5c, an adaptive controller 6, first selectors 7a to 7d, second selectors 7e to 7h, and a coefficient storage circuit 22. The tap registers 1a to 1d, multipliers 2a to 2d, an adder 3, decision circuits 4a and 4b, delay circuits 5a to 5c, an adaptive controller 6, first selectors 7a to 7d, second selectors 7e to 7h, are the same as those of the first embodiment shown in FIG. 3.

The coefficient storage circuit 22 cyclically inputs the coefficients of taps 0 to 3 held by the tap registers 1a to 1d and outputs the coefficients to the second selectors 7e to 7h provided on the data input side, based on the operation clock e, the coefficient storage signal f, and the stored coefficient reset signal g.

The first selectors 7a to 7d and the second selectors 7e to 7h selectively supply the output of the adaptive controller 6, the output of the coefficient storage circuit 22, or the outputs of the tap registers 1a to 1d to the tap registers 1a to 1d, based on the value of the coefficient fix signal d and the value of the stored coefficient load signal h.

If the stored coefficient load signal h is on a low level, the output of the adaptive controller 6 is selected when the coefficient fix signal d is on a low level, and the outputs of the tap registers 1a to 1d are supplied to the tap registers 1a to 1d when the coefficient fix signal d is on a high level. If the stored coefficient load signal h is on a high level, the outputs (y0 to y3) of the coefficient storage circuit 22 are supplied to the tap registers 1a to 1d irrespective of the value of the coefficient fix signal d.

FIG. 17 is a diagram showing a configuration of the coefficient storage circuit 22.

The coefficient storage circuit 22 includes first registers 9a to 9d, second registers 9e to 9h, and three groups of selectors 7i to 7l, 7m to 7p, and 7v to 7y provided to correspond to the registers. These are cascade-connected, the tap coefficients (x0 to x3) of the tap registers 1a to 1d are input to the first registers 9a to 9d via the selectors 7i to 7l, and also input to the selectors 7v to 7y.

The tap coefficients of the first registers 9a to 9d are supplied to the selectors 7v to 7y. Outputs of the selectors 7v to 7y are input to the second registers 9e to 9h via the selectors 7m to 7p.

Every time the operation clock e rises, the registers 9a to 9h take in the tap coefficients supplied to the respective registers. When the coefficient storage signal f is on a low level, the tap coefficients held in the registers 9a to 9h are fed back to their inputs via the selectors 7i to 7p, and their contents are not therefore changed.

In contrast, when the coefficient storage signal f is on a high level and the stored coefficient reset signal g is in a low level state, the tap coefficients of the tap registers 1a to 1d are supplied to the first registers 9a to 9d via the selectors 7i to 7l. The tap coefficients of the first registers 9a to 9d are supplied to the second registers 9e to 9h via selectors 7v to 7y and 7m to 7p.

If the operation clock e rises in the state in which the coefficient storage signal f and the stored coefficient reset signal g are on a high level, the first registers 9a to 9d the second registers 9e to 9h take in the tap coefficients (x0 to x3) of the tap registers 1a to 1d.

FIG. 18 is a timing chart for explanation of the operation of the DFE 23.

The FG operation and the BG operation are changed in response to the presence and absence of the operation command supplied from the upper layer. In addition, the BG operation is stopped and an appropriate tap coefficient at this time is held in the EI period which is the no-signal period. After the EI period is ended, the BG operation is restarted.

Operation clock e, coefficient fix signal d, and stored coefficient load signal h are the same as those of the first embodiment.

In the third embodiment, a coefficient storage signal f is used instead of a coefficient storage clock c, as a signal for storing a tap coefficient in the coefficient storage circuit 22. The coefficient storage signal f rises in cycle T2 while the DFE 23 adaptively controls the tap coefficient in the BG operation.

In addition, the stored coefficient reset signal g is used as a signal to cancel an unnecessary tap coefficient from the coefficient storage circuit 22.

When the DFE 23 changes the FG operation to the BG operation or changes the EI state to the BG operation, the stored coefficient reset signal g executes rise and fall at one time at the same timing as the coefficient storage signal f, and then remains on a low level.

The coefficient storage circuit 22 according to the third embodiment is configured to take coefficients of taps 0 to 3 in the first registers 9a to 9d and the second registers 9e to 9h via the selectors 7i to 7l, 7m to 7h, and 7m to 7p.

When the coefficient storage signal f is on a high level, the selectors 7i to 7l and 7m to 7p operate to take new tap coefficients in the first registers 9a to 9d and the second registers 9e to 9h.

More specifically, when the coefficient storage signal f is on a high level, the selectors 7i to 7l select the coefficients of taps 0 to 3 which are output from the tap registers 1a to 1d and take the coefficients in the first registers 9a to 9d, irrespective of the level of the stored coefficient reset signal g.

When the stored coefficient reset signal g is on a low level state and the coefficient storage signal f is on a high level, the selectors 7v to 7y and 7m to 7p select the coefficients of taps 0 to 3 which are output from the first registers 9a to 9d and take the coefficients in the second registers 9e to 9h.

By repeating the shift operation, the coefficients of taps 0 to 3 are cyclically held in the first registers 9a to 9d and the second registers 9e to 9h of the coefficient storage circuit 22. The coefficients of taps 0 to 3 held in the second registers 9e to 9h are stored in the tap registers 1a to 1d via the second selectors 7e to 7h provided on the data input side.

As shown in FIG. 18, the coefficient storage signal f in which the cycle of taking in the coefficient is determined rises in cycle T2 in the BG operation. Thus, by setting rise cycle T2 of the coefficient storage signal f to be longer than EI start detection delay time T0, even in the EI state during the BG operation, the tap coefficients updated at this time (inappropriate tap coefficients) does not need to be taken in or at least one of them needs only to be taken in the first registers 9a to 9d, similarly to the first and second embodiments.

At this time, the tap coefficients held by the second registers 9e to 9h are the tap coefficients obtained before EI start detection delay time T0, and have appropriate values. Therefore, when the EI start is detected internally, if the coefficient fix signal d and the stored coefficient load signal h are output and the tap coefficients held in the second registers 9e to 9h are fixed to the tap registers 1a to 1d via the second selectors 7a to 7h, the operation error of the DFE 23 in the EI period can be prevented.

In addition, the tap coefficients obtained in EI start detection delay time T0 may remain in the first registers 9a to 9d, after the end of the EI period. Since the EI state actually occurs in period T0, there is high possibility that the tap coefficients may be abnormal values.

To cancel the tap coefficients, in the third embodiment, when the DFE 23 restarts the operation of updating the tap coefficients (when the FG operation is changed to the BG operation or the EI state is changed to the BG operation), the coefficient storage signal f and the stored coefficient reset signal g simultaneously rise in the state in which the tap coefficients of the tap registers 1a to 1d are fixed (the coefficient fix signal d is on a high level).

Thus, the tap coefficients held in the first registers 9a to 9d and the second registers 9e to 9h are rewritten to the fixed tap coefficients of the tap registers 1a to 1d. Therefore, even if the tap coefficients obtained in the EI state remain in the coefficient storage circuit 22, the operation of updating the tap coefficients can be restarted after canceling the obtained tap coefficients.

Similarly to the timing shown in FIG. 8, if the EI start is detected before the tap coefficients are stored in the coefficient storage circuit 22 after the end of FG, the stored coefficient load signal h remains on a low level and the values of the tap registers 1a to 1d are not changed. Even if the operation is BG before detecting the EI start, the stored coefficient load signal h remains on a low level and the values of the tap registers 1a to 1d are not changed.

The configuration of the DFE of taps 0 to 3 shown in FIG. 16 is a mere example, and the tap number may be increased or decreased. For example, taps 2 and 3 may not be provided.

The coefficient storage circuit 22 shown in FIG. 17 is also a mere example, and the number of cascade-connected registers cyclically holding the tap coefficients may be two or more.

Thus, according to the third embodiment, the tap coefficients held before T0 can be fixed even in the EI state in the BG operation, similarly to the first and second embodiments. Therefore, even if the DFE is adaptively operated during the BG operation except the operation command period, the operation error of the DFE in the EI state can be prevented and the high-reliability data communications can be implemented.

In addition, in the third embodiment, the unnecessary tap coefficients can be certainly canceled by using the coefficient storage signal f and the stored coefficient reset signal g.

Modified Example

Figure 19:
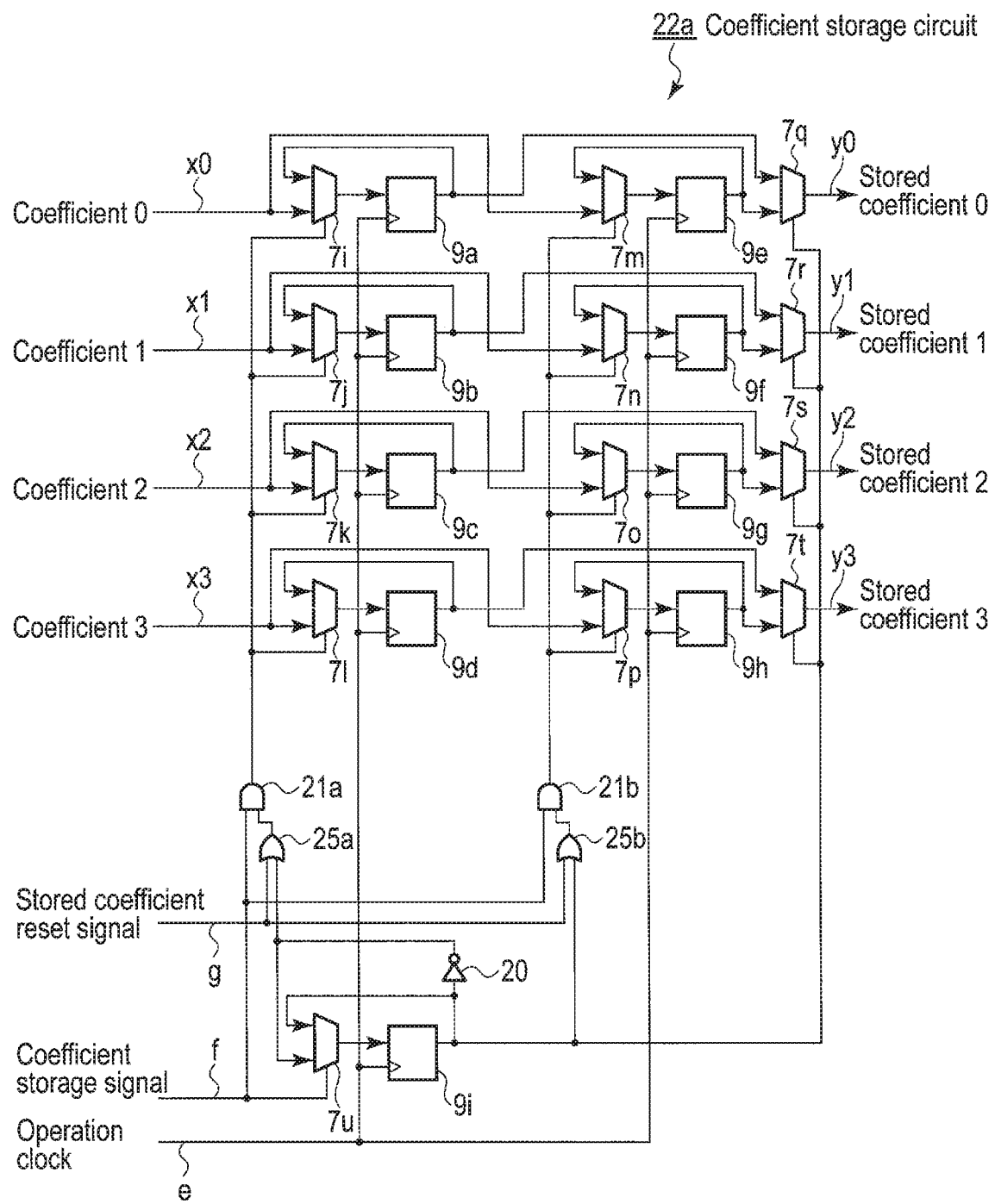
FIG. 19 is a diagram showing an inner configuration of another coefficient storage circuit as a modified example of the third embodiment.

FIG. 19 shows another inner configuration of a coefficient storage circuit 22a as a modified example of the third embodiment. In the figure, 7i to 7u are selectors, 9a to 9i are registers, 20 is an inverter, 21a and 21b are AND gates, and 25a and 25b are OR gates.

The tap coefficients (x0 to x3) of the tap registers 1a to 1d are input to the first registers 9a to 9d via the selectors 7i to 7l, and also input to the second registers 9e to 9h in parallel via the selectors 7m to 7p. The tap coefficients of the first registers 9a to 9d and the tap coefficients of the second registers 9e to 9h are output to the outside via the selectors 7q to 7t, as y0 to y3.

According to the configuration, the first registers 9a to 9d and the second registers 9e to 9h are connected parallel, and the coefficient storage signal f and the stored coefficient reset signal g are supplied to the selectors 7i to 7l, the selectors 7m to 7h, and the selectors 7q to 7t via a selector 7u, a register 9i, an inverter 20, AND gates 21a and 21b, and OR gates 25a and 25b. The coefficients of taps 0 to 3 are cyclically held in the first registers 9a to 9d and second registers 9e to 9h, at the timing shown in FIG. 18.

According to at least one of the above-explained embodiments, the receiving device capable of normally operating the DFE in a no-signal period and continuing preferable communications can be provided.

An example of EI in periods out of the period of asserting the operation command defined under the PCIe Gen3 has been explained in each of the embodiments, but the same advantages can be obtained by applying the manner explained in each of the embodiments, in the no-signal period in which no data input exist.

In addition, the manner explained in each of the embodiments can be programmed and provided to the outside via a recording medium or a communication medium.

The receiving device explained in each of the embodiments can be applied to all electronic devices executing serial data communications.

FIG. 20 shows an example of applying the receiving device to a storage device. The storage device is implemented as, for example, a solid-state drive (SSD) 100 provided with a NAND flash memory.

The SSD 100 can be connected to a host (host device) 200 via a serial interface comprising a link including lane 0, lane 1, . . . lane N.

The host 200 includes a CPU (host CPU) 201, a route complex 202, and a memory 203.

The CPU 201 is a processor configured to control components in the host 200. The CPU 201 runs various programs loaded from the SSD 100 or the other storage device to the memory 203. These programs include an operating system and various application programs. Read commands, write commands, and write data are transmitted from the host 200 to the SSD 100 by respectively corresponding TLP.

The SSD 100 includes a host interface 101, a memory controller 102, and a nonvolatile memory (NAND flash memory) 104. In general, the NAND flash memory 104 includes plural NAND flash memory chips.

The host interface 101 is an interface circuit which executes communications with the host 200 via a link including lane 0, lane 1, . . . lane N. The host interface 101 includes a transmitting circuit 101A corresponding to the plural lanes (lane 0, lane 1, . . . lane N), and a receiving circuit 101B corresponding to the plural lanes (lane 0, lane 1, . . . lane N).

In the storage device having such a configuration, an operation error of the DFE can be prevented and preferable digital communications can be implemented even in the EI state which is a no-signal period, in the GB operation, by applying the receiving device explained in each of the embodiments to the receiving circuit 101B in the host interface 101.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device for executing decision feedback-type equalization for input data using a tap coefficient while updating the tap coefficient, comprising:
   a first memory cyclically receiving the tap coefficient, storing the tap coefficient received, and cyclically outputting the tap coefficient stored; and
   a second memory receiving the tap coefficient cyclically output from the first memory and storing the tap coefficient received,
   wherein
   the tap coefficient cyclically output from the first memory is delayed by at least one cycle from the tap coefficient cyclically received by the first memory, and
   the tap coefficient stored in the second memory is used for the decision feedback-type equalization in a no-signal period in which no input data exist.

2. The electronic device of claim 1, wherein
   the first memory cyclically receives the tap coefficient in a first cycle which is set to be longer than an inner delay time until the no-signal period is detected, and
   the tap coefficient cyclically output from the first memory is delayed by the at least one cycle from the tap coefficient cyclically received by the first memory.

3. The electronic device of claim 2, wherein
   when restarting at least an operation of updating the tap coefficient, the tap coefficient already stored in the first memory and the tap coefficient already stored in the second memory are rewritten in a second cycle different from the first cycle.

4. The electronic device of claim 3, wherein
   the second cycle is set to be shorter than the first cycle.

5. The electronic device of claim 1, wherein
   the first memory and the second memory store tap coefficients updated in a period in which no operation command is asserted from an upper layer in PCIe standard.

6. The electronic device of claim 1, wherein
   the first memory comprises a first register,
   the second memory comprises a second register cascade-connected or connected in parallel to the first register, and
   the first register and the second register store tap coefficients in synchronization with a first control signal set to be longer than an inner delay time until the no-signal period is detected.

7. The electronic device of claim 6, wherein
   the first register and the second register store tap coefficients in synchronization with a second control signal output in a cycle shorter than the first control signal, immediately after an end of at least the no-signal period.

8. The electronic device of claim 6, wherein
   at least a first pulse width for the first control signal is set, immediately after an end of the no-signal period to be wider than a second pulse width corresponding to a cycle of taking in the tap coefficient during the no-signal period, and
   the first register and the second register store the tap coefficients with the second pulse width, in synchronization with the first control signal immediately after the end of the no-signal period.

9. A method for controlling of an electronic device executing decision feedback-type equalization for input data using a tap coefficient while updating the tap coefficient, the method comprising:
   cyclically inputting the tap coefficient to a first memory;
   storing the tap coefficient by the first memory;
   cyclically outputting the tap coefficient from the first memory;
   inputting the tap coefficient to a second memory; and
   storing the tap coefficient by the second memory,
   delaying the tap coefficient cyclically output from the first memory by at least one cycle from the tap coefficient cyclically input to the first memory, and
   using the tap coefficient stored in the second memory for the decision feedback-type equalization in a no-signal period in which no input data exist.

10. The method of claim 9, further comprising:
   cyclically inputting to the first memory the tap coefficient in a first cycle which is set to be longer than an inner delay time until the no-signal period is detected, and
   delaying the tap coefficient cyclically output from the first memory by the at least one cycle from the tap coefficient cyclically input to the first memory.

11. The method of claim 10, further comprising:
   when restarting at least an operation of updating the tap coefficient, rewriting the tap coefficient already stored in the first memory and the tap coefficient already stored in the second memory in a second cycle different from the first cycle.

12. The method of claim 11, further comprising:
   setting the second cycle to be shorter than the first cycle.

13. The method of claim 9, further comprising:
   storing tap coefficients updated in a period in which no operation command is asserted from an upper layer in PCIe standard, by the first memory and the second memory.

14. The method of claim 9, wherein
   the first memory comprises a first register and
   the second memory comprises a second register cascade-connected or connected in parallel to the first register,
   the method further comprising:
   storing tap coefficients in synchronization with a first control signal set to be longer than an inner delay time until the no-signal period is detected, by the first register and the second register.

15. The method of claim 14, further comprising:
   store tap coefficients in synchronization with a second control signal output in a cycle shorter than the first control signal, immediately after an end of at least the no-signal period, by the first register and the second register.

16. The method of claim 14, further comprising:
   setting at least a first pulse width for the first control signal, immediately after an end of the no-signal period to be wider than a second pulse width corresponding to a cycle of taking in the tap coefficient during the no-signal period, and
   storing the tap coefficients with the second pulse width, in synchronization with the first control signal immediately after the end of the no-signal period by the first register and the second register.

* * * * *